(12) United States Patent
Stack et al.

(10) Patent No.: US 11,105,159 B2
(45) Date of Patent: Aug. 31, 2021

(54) TORSION RESISTANT GAP SUB

(71) Applicant: EVOLUTION ENGINEERING INC., Calgary (CA)

(72) Inventors: Luke A. Stack, Calgary (CA); Aaron W. Logan, Calgary (CA); Justin C. Logan, Calgary (CA); Mojtaba Kazemi Miraki, Calgary (CA); Patrick R. Derkacz, Calgary (CA); Gavin Gaw-wae Lee, Calgary (CA); Hasan Alper Hepguvendik, Mississauga (CA); Daniel W. Ahmoye, Calgary (CA); Angelica J. B. Francoeur, Calgary (CA)

(73) Assignee: Evolution Engineering Inc., Calgary (CA)

( * ) Notice: Subject to any disclaimer, the term of this patent is extended or adjusted under 35 U.S.C. 154(b) by 573 days.

(21) Appl. No.: 15/752,737

(22) PCT Filed: Aug. 12, 2016

(86) PCT No.: PCT/CA2016/050955
§ 371 (c)(1),
(2) Date: Feb. 14, 2018

(87) PCT Pub. No.: WO2017/027966
PCT Pub. Date: Feb. 23, 2017

(65) Prior Publication Data
US 2018/0252049 A1 Sep. 6, 2018

Related U.S. Application Data

(60) Provisional application No. 62/205,549, filed on Aug. 14, 2015.

(51) Int. Cl.
*E21B 17/00* (2006.01)
*H01B 3/12* (2006.01)
(Continued)

(52) U.S. Cl.
CPC .......... *E21B 17/003* (2013.01); *E21B 17/028* (2013.01); *F16L 25/01* (2013.01); *H01B 3/12* (2013.01); *E21B 17/0426* (2013.01)

(58) Field of Classification Search
CPC ....... E21B 17/003; E21B 17/028; F16L 25/01
(Continued)

(56) References Cited

U.S. PATENT DOCUMENTS

2004/0108119 A1* 6/2004 Maguire .................... 166/242.6
2008/0191900 A1* 8/2008 Camwell ............... E21B 17/028
(Continued)

FOREIGN PATENT DOCUMENTS

CA 2329454 A1 6/2001
CA 2508374 A1 6/2004
(Continued)

*Primary Examiner* — Zachary T Dragicevich
(74) *Attorney, Agent, or Firm* — Oyen Wiggs Green & Mutala LLP

(57) ABSTRACT

A gap sub assembly for electromagnetic telemetry used in downhole drilling. The gap sub comprises a female part comprising a female mating section and a male part comprising a male mating section. The male mating section is matingly received within the female mating section and electrically isolated therefrom. One or more electrically insulating bodies secure the male part axially and torsionally relative to the female part. The electrically insulating bodies also electrically isolate the male part from the female part. The electrically insulating bodies can be installed through apertures in the female part or at least some of the electrically insulating bodies can be installed before the male mating section is inserted into the female mating section. The electrically insulating bodies can be held in place on the male mating section using a retention apparatus such as a ring, a scarf, pods or an adhesive.

19 Claims, 18 Drawing Sheets

(51) Int. Cl.
  *F16L 25/01*    (2006.01)
  *E21B 17/02*    (2006.01)
  *E21B 17/042*   (2006.01)

(58) Field of Classification Search
  USPC .......................................... 166/242.6; 285/94
  See application file for complete search history.

(56) References Cited

U.S. PATENT DOCUMENTS

2015/0211307 A1*  7/2015  Minosyan ............. E21B 17/028
2017/0146164 A1*  5/2017  Simoner
2017/0276274 A1*  9/2017  Michot .................. F16L 25/01

FOREIGN PATENT DOCUMENTS

CA      2778434 A1     4/2011
CA      2889082 A1     5/2014
CA      2891892 A1     5/2014
WO    2014075190 A1    5/2014

* cited by examiner

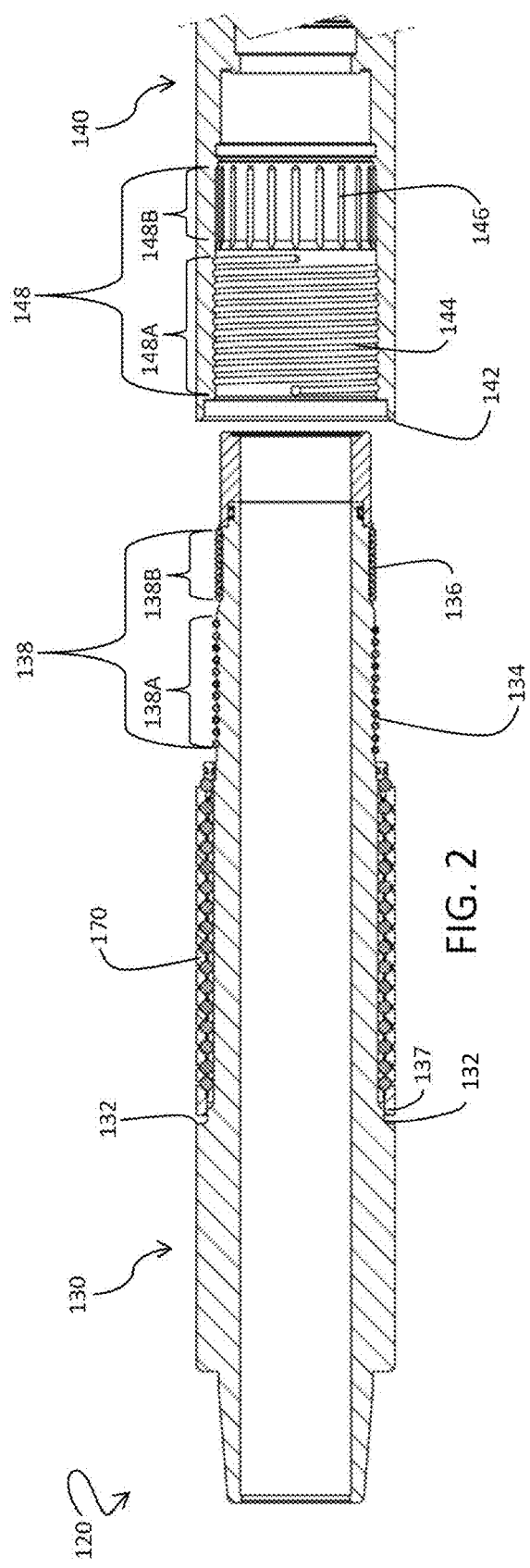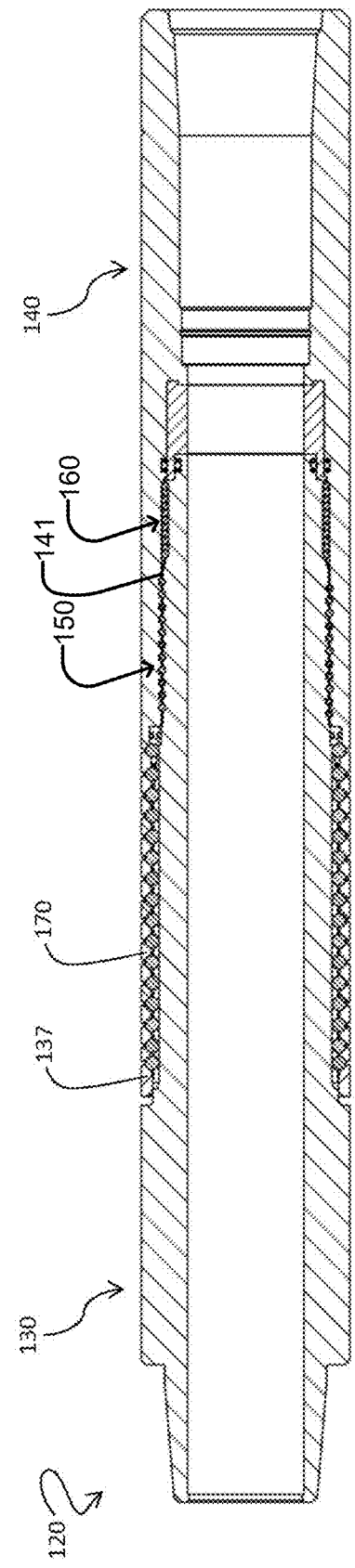

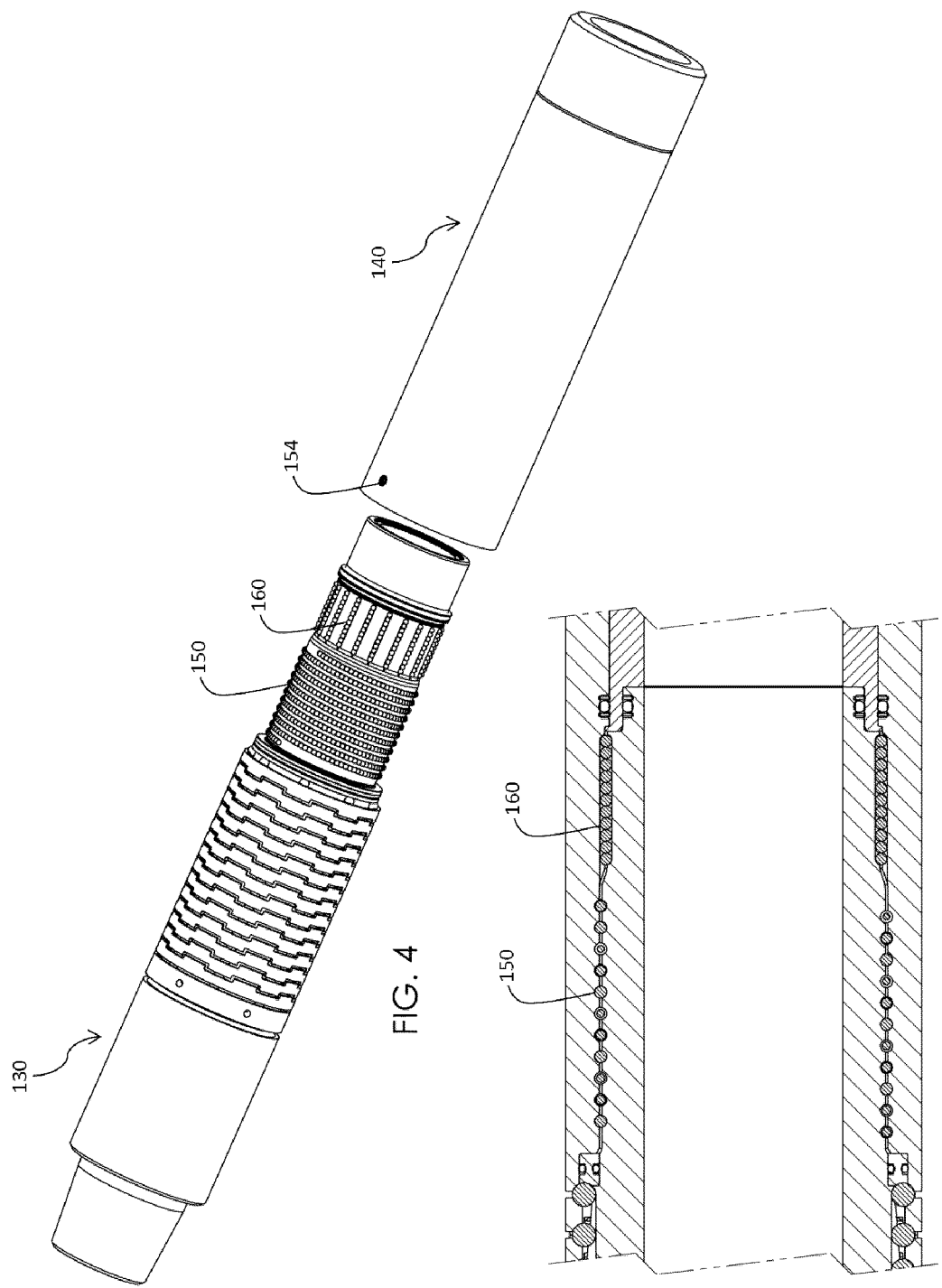

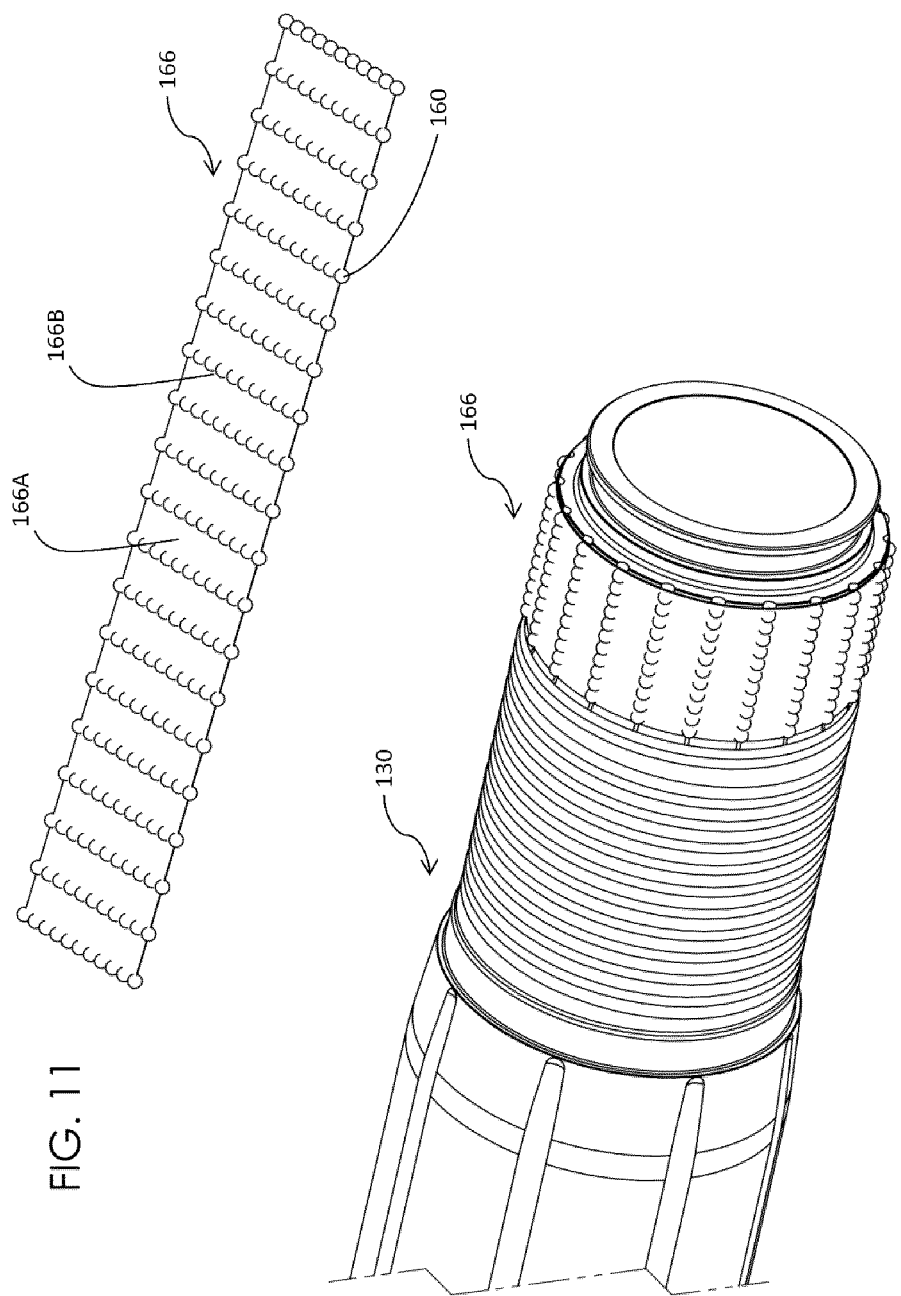

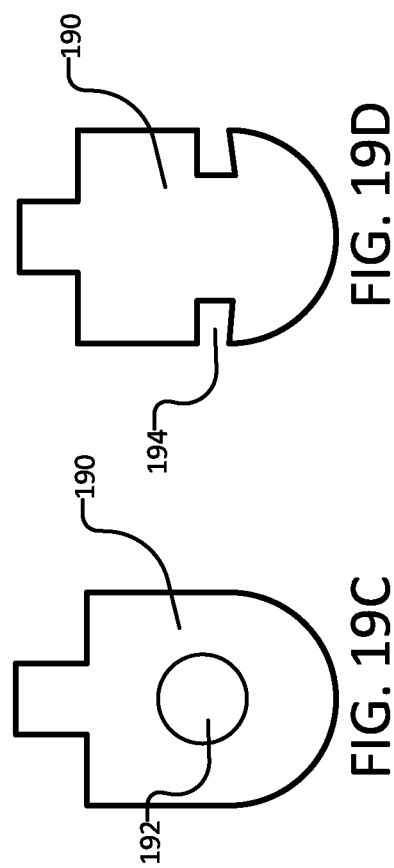
FIG. 19D
FIG. 19C
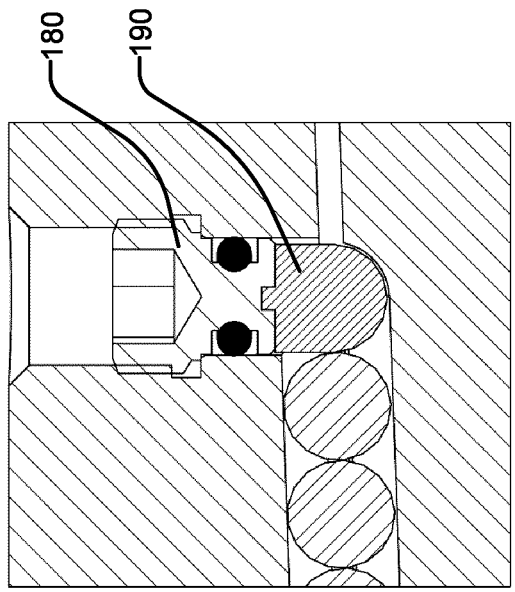
FIG. 19B
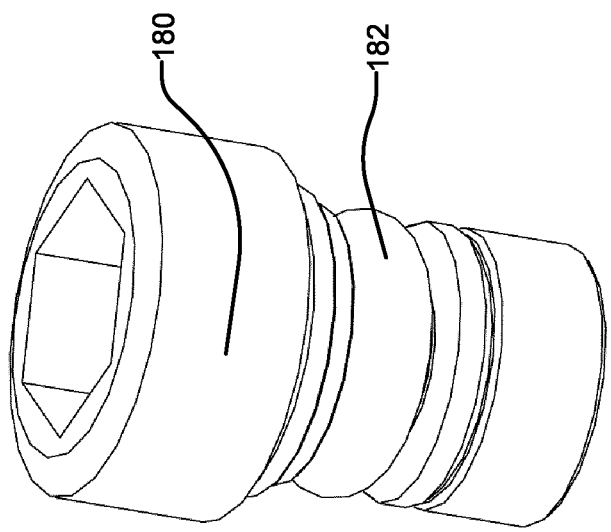
FIG. 19A

TORSION RESISTANT GAP SUB

TECHNICAL FIELD

This application relates to subsurface drilling, specifically to gap sub assemblies suitable for use in measurement while drilling and methods for fabricating gap sub assemblies. Embodiments are applicable to drilling wells for recovering hydrocarbons.

BACKGROUND

Recovering hydrocarbons from subterranean zones typically involves drilling wellbores.

Wellbores are made using surface-located drilling equipment which drives a drill string that eventually extends from the surface equipment to the formation or subterranean zone of interest. The drill string can extend thousands of feet or meters below the surface. The terminal end of the drill string includes a drill bit for drilling (or extending) the wellbore. Drilling fluid, usually in the form of a drilling "mud", is typically pumped through the drill string. The drilling fluid cools and lubricates the drill bit and also carries cuttings back to the surface. Drilling fluid may also be used to help control bottom hole pressure to inhibit hydrocarbon influx from the formation into the wellbore and potential blow out at surface.

Bottom hole assembly (BHA) is the name given to the equipment at the terminal end of a drill string. In addition to a drill bit, a BHA may comprise elements such as: apparatus for steering the direction of the drilling (e.g. a steerable downhole mud motor or rotary steerable system); sensors for measuring properties of the surrounding geological formations (e.g. sensors for use in well logging); sensors for measuring downhole conditions as drilling progresses; one or more systems for telemetry of data to the surface; stabilizers; heavy weight drill collars; pulsers; and the like. The BHA is typically advanced into the wellbore by a string of metallic tubulars (drill pipe).

Modern drilling systems may include any of a wide range of mechanical/electronic systems in the BHA or at other downhole locations. Such electronic systems may be packaged as part of a downhole probe. A downhole probe may comprise any active mechanical, electronic, and/or electromechanical system that operates downhole. A probe may provide any of a wide range of functions including, without limitation: data acquisition; measuring properties of the surrounding geological formations (e.g. well logging); measuring downhole conditions as drilling progresses; controlling downhole equipment; monitoring status of downhole equipment; directional drilling applications; measuring while drilling (MWD) applications; logging while drilling (LWD) applications; measuring properties of downhole fluids; and the like.

A probe may comprise one or more systems for: telemetry of data to the surface; collecting data by way of sensors (e.g. sensors for use in well logging) that may include one or more of vibration sensors, magnetometers, inclinometers, accelerometers, nuclear particle detectors, electromagnetic detectors, acoustic detectors, and others; acquiring images; measuring fluid flow; determining directions; emitting signals, particles or fields for detection by other devices; interfacing to other downhole equipment; sampling downhole fluids; etc.

A downhole probe may communicate a wide range of information to the surface by telemetry. Telemetry information can be invaluable for efficient drilling operations. For example, telemetry information may be used by a drill rig crew to make decisions about controlling and steering the drill bit to optimize the drilling speed and trajectory based on numerous factors, including legal boundaries, locations of existing wells, formation properties, hydrocarbon size and location, etc. A crew may make intentional deviations from the planned path as necessary based on information gathered from downhole sensors and transmitted to the surface by telemetry during the drilling process. The ability to obtain and transmit reliable data from downhole locations allows for relatively more economical and more efficient drilling operations.

There are several known telemetry techniques. These include transmitting information by generating vibrations in fluid in the wellbore (e.g. acoustic telemetry or mud pulse (MP) telemetry) and transmitting information by way of electromagnetic signals that propagate at least in part through the earth (EM telemetry). Other telemetry techniques use hardwired drill pipe, fibre optic cable, or drill collar acoustic telemetry to carry data to the surface.

Advantages of EM telemetry, relative to MP telemetry, include generally faster baud rates, increased reliability due to no moving downhole parts, high resistance to lost circulating material (LCM) use, and suitability for air/underbalanced drilling. An EM system can transmit data without a continuous fluid column; hence it is useful when there is no drilling fluid flowing. This is advantageous when a drill crew is adding a new section of drill pipe as the EM signal can transmit information (e.g. directional information) while the drill crew is adding the new pipe. Disadvantages of EM telemetry include lower depth capability, incompatibility with some formations (for example, high salt formations and formations of high resistivity contrast), and some market resistance due to acceptance of older established methods. Also, as the EM transmission is strongly attenuated over long distances through the earth formations, it requires a relatively large amount of power so that the signals are detected at surface. The electrical power available to generate EM signals may be provided by batteries or another power source that has limited capacity.

A typical arrangement for EM telemetry uses parts of the drill string as an antenna. The drill string may be divided into two conductive sections by including an insulating joint or connector (a "gap sub") in the drill string. The gap sub is typically placed at the top of a BHA such that metallic drill pipe in the drill string above the BHA serves as one antenna element and metallic sections in the BHA serve as another antenna element. Gap subs may additionally or in the alternative be placed at other locations along a drill string. EM telemetry signals can be transmitted by applying electrical signals between the two antenna elements. The signals typically comprise very low frequency alternating current (AC) signals applied in a manner that codes information for transmission to the surface or for transmission to another downhole system. (Higher frequency signals attenuate faster than low frequency signals.) The EM telemetry signals may be detected at the surface, for example, by measuring electrical potential differences between the drill string or a metal casing that extends into the ground and one or more ground rods.

Design of the gap sub is an important factor in an EM telemetry system. The gap sub must provide electrical isolation between two parts of the drill string as well as withstand the extreme mechanical loading induced during drilling and the high differential pressures that occur between the bore and exterior of the drill pipe. Drill string components are typically made from high strength, ductile metal alloys in order to handle the loading without failure. Many electrically-insulating materials suitable for electrically isolating different parts of a gap sub (e.g. rubber, plastic, epoxy) are weaker than the metals generally used to make downhole equipment. Other insulating materials (e.g. ceramics) are quite brittle. The mechanical properties of available electrically-insulating materials makes it difficult to design a gap sub that is both configured to provide efficient transmission of EM telemetry signals and has the mechanical properties (e.g. the ability to withstand applied torques, axial forces, bending moments and shock loads) required of a link in the drill string.

In directional drilling, the trajectory of the wellbore may change rapidly, such as in building of a curve. In cases where the change in direction occurs more rapidly than planned or desired it can lead to harmful side effects within the section or "dogleg". In such cases the casing may not fit easily through the curved section. Repeated abrasion by the drill string in the particular location of the dogleg can result in worn spots in which the BHA may become lodged. Excessive doglegs can also increase the overall friction of the drill string, resulting in increased potential for damage of the BHA. For components such as gap subs which are generally weaker links in the drill string, the potential for damage and excessive wear of the electrically-insulating material is increased by bends in the wellbore.

The reduced diameter of metal structural components passing through external gaps in gap subs can cause the gap to act as a flex collar which can cause excessive stress in the external gap section when undergoing bending. The dielectric material in this gap will usually chip out, crack or buckle due to compressive loading, from wear in the wellbore, or from impact with the wellbore.

There remains a need for resilient, stiff, torsion resistant gap subs that are easy to install.

SUMMARY

The invention has a number of different aspects. These include, without limitation:
  methods for constructing gap sub assemblies;
  gap sub assemblies in which electrically insulating bodies for arresting relative torsional movement between a male part and a female part can be installed before inserting a male part into a female part;
  gap sub components comprising features for facilitating introduction of torque and/or tension resisting members;
  apparatuses for securing spheres or other torsion-resisting elements onto a male part before the male part is inserted into the female part; and
  intermediate fill plugs for preventing O-ring lubrication from contaminating the interior of the gap sub assembly.

The various concepts described herein may be used in any combinations or may be applied individually. These may be applied to make downhole components such as gap subs. For any of the described gap sub constructions which include a collar one can make similar devices that lack a collar.

One example aspect provides a gap sub assembly comprising a male part, a female part and an insulating collar. The male part may be secured to the female part by providing electrically insulating bodies (e.g. spheres) that engage grooves or other indentations in the male and female part. In particular, the grooves may include longitudinal grooves and helical grooves. The electrically insulating bodies may be inserted into a gap through apertures in the male and/or female parts or may be secured to the male part before the male part is inserted into the female part. A high dielectric, nonconductive material may be injected into a radial gap between the external surface of the male part and the internal surface of the female part.

Another example aspect provides securing apparatus for securing electrically insulating bodies to a male part before the male part is inserted into a female part. In particular embodiments, the securing apparatus may comprise a ring having one or more channels for receiving and retaining the electrically insulating bodies. The ring may be slid onto the male part before or after the electrically insulating bodies are received within the ring.

In other embodiments, the securing apparatus may comprise a flexible strip having one or more channels for receiving and retaining the electrically insulating bodies. The flexible strip may be wrapped around the male part before or after the electrically insulating bodies are received within the flexible strip.

In other embodiments, the securing apparatus may comprise one or more pods, wherein each pod has a single channel for receiving and retaining the electrically insulating bodies. The pods may be installed into the grooves of the male part before or after the electrically insulating bodies are received within the pods.

In other embodiments, the securing apparatus may comprise an adhesive material for securing the electrically insulating bodies to the male part. The adhesive may first be installed on the male part before installing the electrically insulating bodies or may be installed on the electrically insulating bodies themselves before installing them on the male part.

Another exemplary aspect provides an intermediate plug for filling an aperture in a male or female part and preventing lubricant from a fill plug O-ring from penetrating into the gap sub. The aperture in the male or female part may be used for inserting electrically insulating bodies. The intermediate fill plug may comprise a polymer plug having one or more recesses for securing the intermediate plug. In some embodiments, the intermediate plug is integral to the fill plug.

The following are some non-limiting example enumerated embodiments which illustrate various aspects of the invention.

1. A gap sub assembly comprising:
    a female part having a female mating section and a male part electrically isolated from the female part, the male part having a male mating section and a gap section, the male mating section being inserted into a bore of the female mating section whereby the male and female mating sections overlap in an axial direction and are spaced radially apart from one another to provide a radial gap between the male and female mating sections wherein the male mating section comprises a first generally cylindrical male mating subsection having a first external diameter and one or more longitudinal grooves formed into an exterior surface thereof and a second generally cylindrical male mating subsection having a second external diameter greater than the first external diameter and one or more circumferentially-extending grooves formed into an exterior surface thereof with a step between the first and second male mating subsections and the female mating section comprises a first female mating subsection having a first internal diameter greater than the first external diameter and one or more longitudinal grooves formed into an interior surface thereof a second female mating subsection having a second internal diameter greater than the second external diameter and the first internal diameter and one or more circumferentially-extending grooves formed into an interior surface thereof;

an electrically insulating collar positioned on the gap section;

a first plurality of electrically-insulating bodies located between the overlapping male and female mating sections and spanning between corresponding ones of the longitudinal grooves in the first male and female mating subsections;

a second plurality of electrically-insulating bodies located between the overlapping male and female mating sections and spanning between corresponding ones of the circumferentially-extending grooves in the second male and female mating subsections;

such that the male and female parts are mechanically coupled together.

2. A gap sub assembly according to enumerated example embodiment 1 (or any other example enumerated embodiment), wherein the one or more longitudinal grooves of the male mating section are radially aligned with corresponding ones of the one or more longitudinal grooves of the female mating section.

3. A gap sub assembly according to enumerated example embodiment 2 (or any other example enumerated embodiment), wherein the first plurality of electrically-insulating bodies comprises a plurality of first spheres.

4. A gap sub assembly according to enumerated example embodiment 1 (or any other example enumerated embodiment) comprising a member located in the radial gap that attaches together two or more of the first plurality of electrically-insulating bodies.

5. A gap sub assembly according to enumerated example embodiment 4 (or any other example enumerated embodiment), wherein the member comprises a ring extending around the first male mating subsection and the two or more of the first plurality of electrically-insulating bodies are embedded in the ring.

6. A gap sub assembly according to enumerated example embodiment 4 (or any other example enumerated embodiment), wherein the member comprises a scarf comprising a sheet of flexible material wrapped around the first male mating subsection and the two or more of the first plurality of electrically-insulating bodies are attached to the scarf.

7. A gap sub assembly according to enumerated example embodiment 4 (or any other example enumerated embodiment), wherein the member attaches together two or more of the electrically insulating bodies that span between the same ones of the longitudinal grooves in the first male and female mating subsections.

8. A gap sub assembly according to any of enumerated example embodiments 1 to 7 (or any other example enumerated embodiment), wherein the one or more circumferentially-extending grooves of the male mating section are radially aligned with corresponding ones of the one or more circumferentially-extending grooves of the female mating section.

9. A gap sub assembly according to enumerated example embodiment 8 (or any other example enumerated embodiment) wherein the circumferentially-extending grooves of the male and female mating sections extend helically around surfaces of the male and female mating sections respectively.

10. A gap sub assembly according to any one of enumerated example embodiments 1 to 9 (or any other example enumerated embodiment) wherein the second plurality of electrically-insulating bodies comprises a plurality of second spheres.

11. A gap sub assembly according to any one of enumerated example embodiments 1 to 10 (or any other example enumerated embodiment) comprising a dielectric material filling the radial gap around the first and second pluralities of electrically-insulating bodies.

12. A gap sub assembly according to any of enumerated example embodiments 1 to 11 (or any other example enumerated embodiment), wherein the first plurality of electrically-insulating bodies comprise ceramic bodies.

13. A gap sub assembly according to any of enumerated example embodiments 1 to 12 (or any other example enumerated embodiment), wherein the second plurality of electrically-insulating bodies comprise ceramic bodies.

14. A gap sub assembly according to any of enumerated example embodiments 1 to 13 (or any other example enumerated embodiment), comprising first and second shoulders respectively on the male and female parts at first and second ends of the gap section and wherein the insulating collar is pre-loaded in compression to bear against the first and second shoulders with a pre-load force.

15. A gap sub assembly according to any of enumerated example embodiments 1 to 13 (or any other example enumerated embodiment), comprising a threaded ring mounted adjacent to the gap section, the threaded ring operable to adjust a compression of the insulating collar.

16. A gap sub assembly according to any one of enumerated example embodiments 1 to 15 (or any other example enumerated embodiment) comprising one or more fill openings, each of the fill openings extending from a surface of the gap sub to a corresponding one of the circumferentially-extending grooves, the fill openings each dimensioned to allow passage of a body of the second plurality of bodies into the radial gap.

17. A gap sub assembly according to enumerated example embodiment 16 (or any other example enumerated embodiment) wherein one or more of the fill openings is closed by a fill plug comprising an elastomer seal.

18. A gap sub assembly according to enumerated example embodiment 17 (or any other example enumerated embodiment) wherein the elastomer seal comprises an O-ring.

19. A gap sub assembly according to enumerated example embodiment 17 or 18 (or any other example enumerated embodiment) comprising an intermediate plug installed in the fill opening between the fill plug and the corresponding one of the circumferentially-extending grooves.

20. A gap sub comprising:
a female part having a female mating section;
a male part electrically isolated from the female part, the male part having a male mating section and a gap section, the male mating section being inserted into a bore of the female mating section whereby the male and female mating sections overlap in an axial direction and are spaced radially apart from one another to provide a radial gap between the male and female mating sections wherein surfaces of the male mating section and female mating section facing one another across the radial gap comprise corresponding grooves;
an electrically insulating collar positioned on the gap section;
a plurality of electrically-insulating bodies located between the overlapping male and female mating sections and spanning between corresponding ones of the grooves in the surfaces of the male and female mating sections such that the male and female parts are mechanically coupled together;

wherein at least one of the surfaces of the male mating section and female mating section facing one another across the radial gap is formed such that opposing edges of at least some of the grooves on the at least one surface have different elevations.

21. A gap sub according to enumerated example embodiment 20 (or any other example enumerated embodiment) wherein the surfaces of both the male and female mating sections are formed such that opposing edges of at least some of the grooves on each of the surfaces have different elevations.

22. A gap sub according to enumerated example embodiment 21 (or any other example enumerated embodiment) wherein for at least some pairs of the corresponding grooves a higher side of the groove on the male mating section is radially outward relative to a higher side of the groove on the female mating section.

23. A gap sub according to enumerated example embodiment 22 (or any other example enumerated embodiment) wherein a centroid of at least one of the bodies that spans between the grooves of the pair of corresponding grooves is radially between the higher side of the groove on the male mating section and the higher side of the groove on the female mating section.

24. A gap sub according to any one of enumerated example embodiments 21 to 23 (or any other example enumerated embodiment) wherein for a pair of corresponding grooves respectively on the male and female mating sections higher and lower sides of the corresponding groove on the male mating section are respectively radially aligned with lower and higher sides of the corresponding groove on the female mating section.

25. A gap sub according to any one of enumerated example embodiments 20 to 24 (or any other example enumerated embodiment) wherein the bodies comprise spherical balls.

26. A gap sub according to any one of enumerated example embodiments 20 to 24 (or any other example enumerated embodiment) wherein the bodies are cylindrical.

27. A gap sub according to any one of enumerated example embodiments 20 to 24 (or any other example enumerated embodiment) wherein the bodies comprise elongated rods.

28. A gap sub according to enumerated example embodiment 27 (or any other example enumerated embodiment) wherein the rods are segmented.

29. A gap sub according to enumerated example embodiment 27 or 28 (or any other example enumerated embodiment) wherein the rods are non-circular in cross-section.

30. A gap sub according to enumerated example embodiment 29 (or any other example enumerated embodiment) wherein the rods are polygonal in cross section.

31. A gap sub according to any one of enumerated example embodiments 20 to 30 (or any other example enumerated embodiment) wherein at least some of the grooves extend substantially longitudinally along the gap sub.

32. A gap sub according to enumerated example embodiment 31 (or any other example enumerated embodiment) wherein higher and lower sides of the longitudinal grooves on the male mating section are arranged such that for two adjacent ones of the grooves the higher sides of the adjacent grooves are adjacent or the lower sides of the adjacent grooves are adjacent.

33. A gap sub according to enumerated example embodiment 31 (or any other example enumerated embodiment) wherein higher and lower sides of the longitudinal grooves on the male mating section are arranged such that for two adjacent ones of the grooves the higher side one of the adjacent grooves is adjacent to the lower sides of the other adjacent groove.

34. A gap sub according to any one of enumerated example embodiments 20 to 33 (or any other example enumerated embodiment) wherein at least some of the grooves comprise pockets formed in one wall of the groove, the pockets shaped to conform with surfaces of the bodies.

35. A gap sub according to enumerated example embodiment 34 (or any other example enumerated embodiment) wherein the pockets comprise spherical cups spaced apart along the one wall of the groove.

36. A gap sub according to any one of enumerated example embodiments 20 to 35 (or any other example enumerated embodiment) wherein bottom surfaces of the grooves are arcuate.

37. A gap sub according to any one of enumerated example embodiments 20 to 35 (or any other example enumerated embodiment) wherein the grooves are V-shaped in cross section.

38. A gap sub according to any one of enumerated example embodiments 20 to 37 wherein, for some or all of the plurality of bodies, the body projects more deeply into one of the corresponding grooves than into the other one of the corresponding grooves.

39. A gap sub according to enumerated example embodiment 38 (or any other example enumerated embodiment) wherein the body projects more deeply into the corresponding groove on the male mating section than into the corresponding groove on the female mating section.

40. A gap sub according to any one of enumerated example embodiments 20 to 39 (or any other example enumerated embodiment) comprising a longitudinal bore extending through the gap sub and threaded couplings on opposing ends of the gap sub.

41. A gap sub according to enumerated example embodiment 40 (or any other example enumerated embodiment) wherein one of the threaded couplings is a pin coupling comprising a male thread and one of the threaded couplings is a box coupling comprising a female thread.

42. A gap sub comprising:
a female part having a female mating section;
a male part electrically isolated from the female part, the male part having a male mating section and a gap section, the male mating section being inserted into a bore of the female mating section whereby the male and female mating sections overlap in an axial direction and are spaced radially apart from one another to provide a radial gap between the male and female mating sections wherein surfaces of the male mating section and female mating section facing one another across the radial gap comprise corresponding grooves;
an electrically insulating collar positioned on the gap section;
a plurality of electrically-insulating bodies located between the overlapping male and female mating sections and spanning between corresponding ones of the grooves in the surfaces of the male and female mating sections such that the male and female parts are mechanically coupled together;
wherein for at least some pairs of the corresponding grooves on the male and female mating sections the grooves are formed such that the body projects more deeply into one of the corresponding grooves than the other one of the corresponding grooves.

43. A gap sub according to enumerated example embodiment 42 (or any other example enumerated embodiment) wherein the body projects more deeply into the corresponding groove on the male mating section than into the corresponding groove on the female mating section.
44. A gap sub according to any one of enumerated example embodiments 42 or 43 (or any other example enumerated embodiment) wherein the bodies comprise spherical balls.
45. A gap sub according to any one of enumerated example embodiments 42 or 43 (or any other example enumerated embodiment) wherein the bodies are cylindrical.
46. A gap sub according to any one of enumerated example embodiments 42 or 43 (or any other example enumerated embodiment) wherein the bodies comprise elongated rods.
47. A gap sub according to enumerated example embodiment 46 (or any other example enumerated embodiment) wherein the rods are segmented.
48. A gap sub according to enumerated example embodiment 46 or 47 (or any other example enumerated embodiment) wherein the rods are non-circular in cross-section.
49. A gap sub according to enumerated example embodiment 48 (or any other example enumerated embodiment) wherein the rods are polygonal in cross section.
50. A gap sub according to any one of enumerated example embodiments 46 to 48 (or any other example enumerated embodiment) wherein a portion of the rod projects into each of the corresponding grooves and the corresponding grooves are shaped to conform with the shapes of the surfaces of the respective portions of the rod.
51. A gap sub according to any one of enumerated example embodiments 42 to 50 (or any other example enumerated embodiment) wherein the bodies are non-circular in cross section and wherein the bodies are oriented such that a major transverse axis of the bodies forms an angle with a radius of the gap sub.
52. A gap sub according to enumerated example embodiment 51 (or any other example enumerated embodiment) wherein for a first group of the bodies the major transverse axis of the bodies forms first angle with a radius of the gap sub passing through a centroid of the body and for a second group of the bodies the major transverse axis of the bodies forms second angle with a radius of the gap sub passing through a centroid of the body.
53. A gap sub according to enumerated example embodiment 52 (or any other example enumerated embodiment) wherein the first angle is equal in magnitude and opposite in sign to the second angle.
54. A gap sub according to any one of enumerated example embodiments 42 to 53 (or any other example enumerated embodiment) wherein at least some of the grooves extend substantially longitudinally along the gap sub.
55. A gap sub according to any one of enumerated example embodiments 42 to 54 (or any other example enumerated embodiment) wherein at least some of the grooves extend substantially circumferentially.
56. A gap sub according to enumerated example embodiment 55 (or any other example enumerated embodiment) wherein the grooves that extend substantially circumferentially include helical portions.
57. A gap sub according to any one of enumerated example embodiments 42 to 56 (or any other example enumerated embodiment) wherein at least some of the grooves comprise pockets formed in one wall of the groove, the pockets shaped to conform with surfaces of the bodies.
58. A gap sub according to enumerated example embodiment 57 (or any other example enumerated embodiment) wherein the pockets comprise spherical cups spaced apart along the one wall of the groove.
59. A gap sub according to enumerated example embodiment 56 or 57 (or any other example enumerated embodiment) wherein each of a groove on the male mating section and a corresponding groove on the female mating section is formed to include the pockets along one wall thereof.
60. A gap sub according to enumerated example embodiment 59 (or any other example enumerated embodiment) wherein the pockets are formed on opposite walls of the corresponding grooves on the male and female mating sections.
61. A gap sub according to enumerated example embodiment 59 or 60 (or any other example enumerated embodiment) wherein the corresponding grooves on the male and female section that include the pockets extend substantially longitudinally.
62. A gap sub according to any one of enumerated example embodiments 57 to 60 (or any other example enumerated embodiment) wherein the bodies in the corresponding grooves are engaged with the pockets such that the bodies are prevented from moving along the corresponding grooves.
63. A gap sub according to any one of enumerated example embodiments 42 to 62 (or any other example enumerated embodiment) comprising a longitudinal bore extending through the gap sub and threaded couplings on opposing ends of the gap sub.
64. A gap sub according to enumerated example embodiment 63 (or any other example enumerated embodiment) wherein one of the threaded couplings is a pin coupling comprising a male thread and one of the threaded couplings is a box coupling comprising a female thread.
65. A gap sub comprising:
    a female part having a female mating section;
    a male part electrically isolated from the female part, the male part having a male mating section and a gap section, the male mating section being inserted into a bore of the female mating section whereby the male and female mating sections overlap in an axial direction and are spaced radially apart from one another to provide a radial gap between the male and female mating sections wherein surfaces of the male mating section and female mating section facing one another across the radial gap comprise corresponding grooves;
    an electrically insulating collar positioned on the gap section;
    a plurality of electrically-insulating bodies located between the overlapping male and female mating sections and spanning between corresponding ones of the grooves in the surfaces of the male and female mating sections such that the male and female parts are mechanically coupled together;
    wherein at least some of the grooves comprise pockets formed in one wall of the groove, the pockets shaped to conform with surfaces of the bodies received in the groove.
66. A gap sub according to enumerated example embodiment 65 (or any other example enumerated embodiment) wherein the bodies are spherical and the pockets comprise spherical cups spaced apart along the one wall of the groove.
67. A gap sub according to enumerated example embodiment 65 (or any other example enumerated embodiment) wherein the bodies are barrel-shaped and the pockets are shaped to conform with curved surfaces of the bodies.

68. A gap sub according to any one of enumerated example embodiments 65 to 67 (or any other example enumerated embodiment) wherein each of a groove on the male mating section and a corresponding groove on the female mating section is formed to include the pockets along one wall thereof.

69. A gap sub according to enumerated example embodiment 68 (or any other example enumerated embodiment) wherein the pockets are formed on opposite walls of the corresponding grooves on the male and female mating sections.

70. A gap sub according to enumerated example embodiment 67 or 68 (or any other example enumerated embodiment) wherein the corresponding grooves on the male and female section that include the pockets extend substantially longitudinally in the gap sub passing through a centroid of the body.

71. A gap sub according to enumerated example embodiment 70 (or any other example enumerated embodiment) wherein the bodies are non-circular in cross section and wherein the bodies are oriented such that a major transverse axis of the bodies forms an angle with a radius of the gap sub.

72. A gap sub according to enumerated example embodiment 71 (or any other example enumerated embodiment) wherein for a first group of the bodies the major transverse axis of the bodies forms first angle with a radius of the gap sub passing through a centroid of the body and for a second group of the bodies the major transverse axis of the bodies forms second angle with a radius of the gap sub passing through a centroid of the body.

73. A gap sub according to enumerated example embodiment 72 (or any other example enumerated embodiment) wherein the first angle is equal in magnitude and opposite in sign to the second angle.

74. A gap sub according to any one of enumerated example embodiments 65 to 73 (or any other example enumerated embodiment) wherein the bodies in the corresponding grooves are engaged with the pockets such that the bodies are prevented from moving along the corresponding grooves.

75. A gap sub according to any one of enumerated example embodiments 65 to 74 (or any other example enumerated embodiment) comprising a longitudinal bore extending through the gap sub and threaded couplings on opposing ends of the gap sub.

76. A gap sub according to enumerated example embodiment 75 (or any other example enumerated embodiment) wherein one of the threaded couplings is a pin coupling comprising a male thread and one of the threaded couplings is a box coupling comprising a female thread.

77. A gap sub comprising:
a female part having a female mating section;
a male part electrically isolated from the female part, the male part having a male mating section and a gap section, the male mating section being inserted into a bore of the female mating section whereby the male and female mating sections overlap in an axial direction and are spaced radially apart from one another to provide a radial gap between the male and female mating sections wherein surfaces of the male mating section and female mating section facing one another across the radial gap comprise corresponding grooves;
an electrically insulating collar positioned on the gap section;
a plurality of electrically-insulating bodies located between the overlapping male and female mating sections and spanning between corresponding ones of the grooves in the surfaces of the male and female mating sections such that the male and female parts are mechanically coupled together;
wherein at least some of the bodies are non-circular in cross section and the grooves in which the non-circular bodies are received are shaped to orient the bodies such that major diameters of the bodies have fixed orientations relative to the gap sub.

78. A gap sub according to enumerated example embodiment 77 (or any other example enumerated embodiment) wherein the non-circular bodies are received in grooves that extend generally longitudinally relative to the gap sub.

79. A gap sub according to enumerated example embodiment 78 (or any other example enumerated embodiment) wherein the bodies are oriented such that a major transverse axis of the bodies forms an angle with a radius of the gap sub that passes through the centroid of the body.

80. A gap sub according to enumerated example embodiment 79 (or any other example enumerated embodiment) wherein for a first group of the bodies the major transverse axis of the bodies forms a first angle with a radius of the gap sub passing through a centroid of the body and for a second group of the bodies the major transverse axis of the bodies forms a second angle with a radius of the gap sub passing through a centroid of the body.

81. A gap sub according to enumerated example embodiment 80 (or any other example enumerated embodiment) wherein the first angle is equal in magnitude and opposite in sign to the second angle.

82. A gap sub according to enumerated example embodiment 80 or 81 (or any other example enumerated embodiment) wherein the bodies of the first group of bodies are arranged in rows extending longitudinally along a first plurality of the generally longitudinal grooves and the bodies of the second group of bodies are arranged in rows extending longitudinally along a second plurality of the generally longitudinal grooves.

83. A gap sub according to enumerated example embodiment 82 (or any other example enumerated embodiment) wherein the grooves containing the bodies of the first group of bodies alternate in a circumferential direction with the grooves containing the bodies of the second group of bodies.

84. A gap sub according to any one of enumerated example embodiments 79 to 83 (or any other example enumerated embodiment) wherein the angle is in the range of 10 to 70 degrees.

85. A gap sub according to any one of enumerated example embodiments 77 to 84 (or any other example enumerated embodiment) wherein the bodies comprise elongated rods.

86. A gap sub according to enumerated example embodiment 85 (or any other example enumerated embodiment) wherein the rods are segmented.

87. A gap sub according to enumerated example embodiment 85 or 86 (or any other example enumerated embodiment) wherein cross sections of the rods have flat facets.

88. A gap sub according to any one of enumerated example embodiments 85 to 87 (or any other example enumerated embodiment) wherein a portion of the rod projects into each of the corresponding grooves and the corresponding grooves are shaped to conform with the shapes of the surfaces of the respective portions of the rod.

89. A gap sub comprising:
a female part having a female mating section;

a male part electrically isolated from the female part, the male part having a male mating section and a gap section, the male mating section being inserted into a bore of the female mating section whereby the male and female mating sections overlap in an axial direction and are spaced radially apart from one another to provide a radial gap between the male and female mating sections wherein surfaces of the male mating section and female mating section facing one another across the radial gap comprise corresponding grooves;

an electrically insulating collar positioned on the gap section;

a plurality of electrically-insulating bodies located between the overlapping male and female mating sections and spanning between corresponding ones of the grooves in the surfaces of the male and female mating sections such that the male and female parts are mechanically coupled together;

wherein at least some of the bodies comprise cylindrical bodies aligned with the corresponding grooves.

90. A gap sub according to enumerated example embodiment 89 (or any other example enumerated embodiment) wherein the cylindrical bodies are circular in cross section.

91. A gap sub according to enumerated example embodiment 89 (or any other example enumerated embodiment) wherein the cylindrical bodies are rectangular in cross section.

92. A gap sub according to enumerated example embodiment 91 (or any other example enumerated embodiment) wherein the cylindrical bodies are square in cross section.

93. A gap sub according to enumerated example embodiment 89 (or any other example enumerated embodiment) wherein the cylindrical bodies are elliptical in cross section.

94. A gap sub according to enumerated example embodiment 89 (or any other example enumerated embodiment) wherein the cylindrical bodies have a bow-tie shape in cross section.

95. A gap sub according to enumerated example embodiment 94 (or any other example enumerated embodiment) wherein the grooves are dovetail grooves.

96. A gap sub according to any one of enumerated example embodiments 89 to 95 (or any other example enumerated embodiment) wherein the cylindrical bodies are curved to match a curvature of the corresponding grooves.

97. A gap sub according to any one of enumerated example embodiments 89 to 95 (or any other example enumerated embodiment) wherein the cylindrical bodies comprise elongated rods.

98. A gap sub according to enumerated example embodiment 97 (or any other example enumerated embodiment) wherein the rods comprise weakened sections spaced longitudinally apart along the rods.

99. A gap sub according to any one of enumerated example embodiments 89 to 98 (or any other example enumerated embodiment) wherein the bodies comprise a ceramic material.

100. A gap sub assembly comprising:
a female part having a female mating section, the female mating section having one or more longitudinal grooves formed into the interior thereof;
a male part having a male mating section and a gap section, the male mating section having one or more longitudinal grooves formed into the exterior thereof and the male mating section being inserted into the female mating section whereby the male and female mating sections overlap;
an insulating collar positioned on the gap section;
one or more longitudinal gaps defined by the longitudinal grooves formed into the male and female sections;
one or more electrically isolating spheres located within one or more of the one or more longitudinal gaps such that the male and female parts are mechanically coupled together but electrically isolated from each other at their mating sections, the spheres held in place at least in part by a torsional ball channel ring; wherein the torsional ball channel ring comprises a tubular sleeve having one or more sleeves formed therein, the one or more sleeves each configured to receive one or more electrically insulating bodies.

101. A gap sub assembly comprising:
a female part having a female mating section, the female mating section having one or more longitudinal grooves formed into the interior thereof;
a male part having a male mating section and a gap section, the male mating section having one or more longitudinal grooves formed into the exterior thereof and the male mating section being inserted into the female mating section whereby the male and female mating sections overlap;
an insulating collar positioned on the gap section thereby electrically isolating the male part from the female part;
one or more longitudinal gaps defined by the longitudinal grooves formed into the male and female sections;
one or more electrically isolating bodies located within one or more of the one or more longitudinal gaps such that the male and female parts are mechanically coupled together but electrically isolated from each other at their mating sections, the electrically insulating bodies held in place at least in part by a torsional ball channel scarf, the torsional ball channel scarf wrapped around at least a portion of the male mating section;
wherein the torsional ball channel scarf comprises a flexible generally rectangular body having one or more sleeves formed therein, the one or more sleeves each configured to receive one or more electrically insulating bodies.

102. A gap sub assembly comprising:
a female part having a female mating section, the female mating section having one or more longitudinal grooves formed into the interior thereof;
a male part having a male mating section and a gap section, the male mating section having one or more longitudinal grooves formed into the exterior thereof and the male mating section being inserted into the female mating section whereby the male and female mating sections overlap;
an insulating collar positioned on the gap section thereby electrically isolating the male part from the female part;
one or more longitudinal gaps defined by the longitudinal grooves formed into the male and female sections;
one or more electrically isolating bodies located within one or more of the one or more longitudinal gaps such that the male and female parts are mechanically coupled together but electrically isolated from each other at their mating sections, the electrically insulating bodies held in place at least in part by one or more torsional ball channel pods;
wherein each torsional ball channel pod comprises a sleeve configured to receive one or more electrically insulating bodies.

103. A method for making a gap sub, the method comprising:
   placing an insulating collar around a gap section of a male part;
   installing one or more first electrically insulating bodies into each of one or more longitudinal channels formed into an exterior of a portion of the male part;
   inserting the male part into a female part such that a protruding portion of each of the one more first electrically insulating bodies engages one or more longitudinal channels formed into an interior of the female part; and
   securing the male part to the female part so as to prevent relative axial movement of the male part with respect to the female part.

104. A method for making a gap sub according to enumerated example embodiment 103, wherein securing the male part to the female part comprises installing one or more second electrically insulating bodies into a helical channel formed between a helical channel on the exterior of the male part and a helical channel on the interior of the female part.

105. A method for making a gap sub according to any of enumerated example embodiments 103 and 104, comprising compressing the insulating collar.

106. A method for making a gap sub according to enumerated example embodiment 105 wherein compressing the insulating collar comprises threading a threaded ring, installed between a shoulder of the male part and the insulating collar, toward the insulating collar.

107. A method for making a gap sub according to enumerated example embodiment 105 wherein compressing the insulating collar comprises threading a threaded ring, installed between a shoulder of the female part and the insulating collar, toward the insulating collar.

108. A method for making a gap sub according to any of enumerated example embodiments 103 to 105, wherein installing one or more first electrically insulating bodies into each of the one or more longitudinal channels formed into an exterior of the male part comprises inserting the one or more first electrically insulating bodies into one or more channels of a torsional ball channel apparatus.

109. A method for making a gap sub according to enumerated example embodiment 108, wherein the torsional ball channel apparatus comprises an adhesive material.

110. A method for making a gap sub according to enumerated example embodiment 105, wherein the torsional ball channel apparatus comprises a torsional ball channel ring, wherein the torsional ball channel ring comprises a tubular sleeve having one or more channels formed therein and the one or more channels are each configured to receive one or more first electrically insulating bodies.

111. A method for making a gap sub according to enumerated example embodiment 105, wherein the torsional ball channel apparatus comprises a torsional ball channel scarf, wherein the torsional ball channel scarf comprises a flexible generally rectangular body having one or more channels formed therein and the one or more channels are each configured to receive one or more first electrically insulating bodies.

112. A method for making a gap sub according to enumerated example embodiment 105, wherein the torsional ball channel apparatus comprises one or more torsional ball channel pods, wherein each torsional ball channel pod comprises a channel configured to receive one or more first electrically insulating bodies.

113. A method for making a gap sub according to any of enumerated example embodiments 105 to 112, wherein the torsional ball channel apparatus is installed on the male mating section before the one or more first electrically insulating bodies are installed in the one or more channels of the torsional ball channel apparatus.

114. A method for making a gap sub according to any of enumerated example embodiments 105 to 113, wherein the torsional ball channel apparatus is installed on the male mating section after the one or more electrically insulating bodies are installed in the one or more channels of the torsional ball channel apparatus.

115. A method for making a gap sub according to any of enumerated example embodiments 105 to 114, wherein the male mating section and the female mating section are dimensioned such that there is a radial gap between the male mating section and the female mating section when the male mating section is inserted into the female mating section.

116. A method for making a gap sub according to enumerated example embodiment 115, comprising inserting a dielectric material into the radial gap.

117. A method for making a gap sub according to enumerated example embodiment 115, comprising inserting a fill plug into the opening in the gap sub.

118. A method for making a gap sub according to enumerated example embodiment 117, wherein the fill plug comprises a lubricated o-ring.

119. A method for making a gap sub according to enumerated example embodiment 118, comprising inserting an intermediate plug into the opening in the gap sub before inserting the fill plug, wherein the intermediate plug forms a barrier to prevent lubricant from passing.

120. A method for making a gap sub according to any of enumerated example embodiments 118 and 119, wherein one or more surfaces of the intermediate plug define one or more recesses.

121. A method for making a gap sub according to any of enumerated example embodiments 103 to 120, wherein the one or more first electrically insulating bodies comprise ceramic electrically insulating spheres.

122. A method for making a gap sub according to any of enumerated example embodiments 104 to 121, wherein the one or more second electrically insulating bodies comprise ceramic electrically insulating spheres.

Further aspects of the invention and features of example embodiments are illustrated in the accompanying drawings and/or described in the following description.

BRIEF DESCRIPTION OF THE DRAWINGS

The accompanying drawings illustrate non-limiting example embodiments of the invention.

FIG. 2 is a partially exploded cross-sectional side view of an exemplary gap sub assembly.

FIG. 3 is a cross-sectional side view of an exemplary gap sub assembly.

FIG. 4 is a partially exploded side view of an exemplary gap sub assembly.

FIG. 5 is a cross-section of a portion of an exemplary gap sub assembly.

FIG. 11 is a perspective view of an exemplary torsional ball channel scarf.

FIG. 12 is a perspective view of an exemplary torsional ball channel scarf installed on a portion of an exemplary gap sub assembly.

FIG. 19A is a perspective view of an exemplary fill plug.

FIG. 19B is a cross sectional view of an exemplary fill plug and intermediate plug installed in an opening of an exemplary gap sub.

FIGS. 19C and 19D are schematic diagrams of exemplary intermediate plugs.

DESCRIPTION

Throughout the following description specific details are set forth in order to provide a more thorough understanding to persons skilled in the art. However, well known elements may not have been shown or described in detail to avoid unnecessarily obscuring the disclosure. The following description of examples of the technology is not intended to be exhaustive or to limit the system to the precise forms of any example embodiment. Accordingly, the description and drawings are to be regarded in an illustrative, rather than a restrictive, sense.

Figure 1:
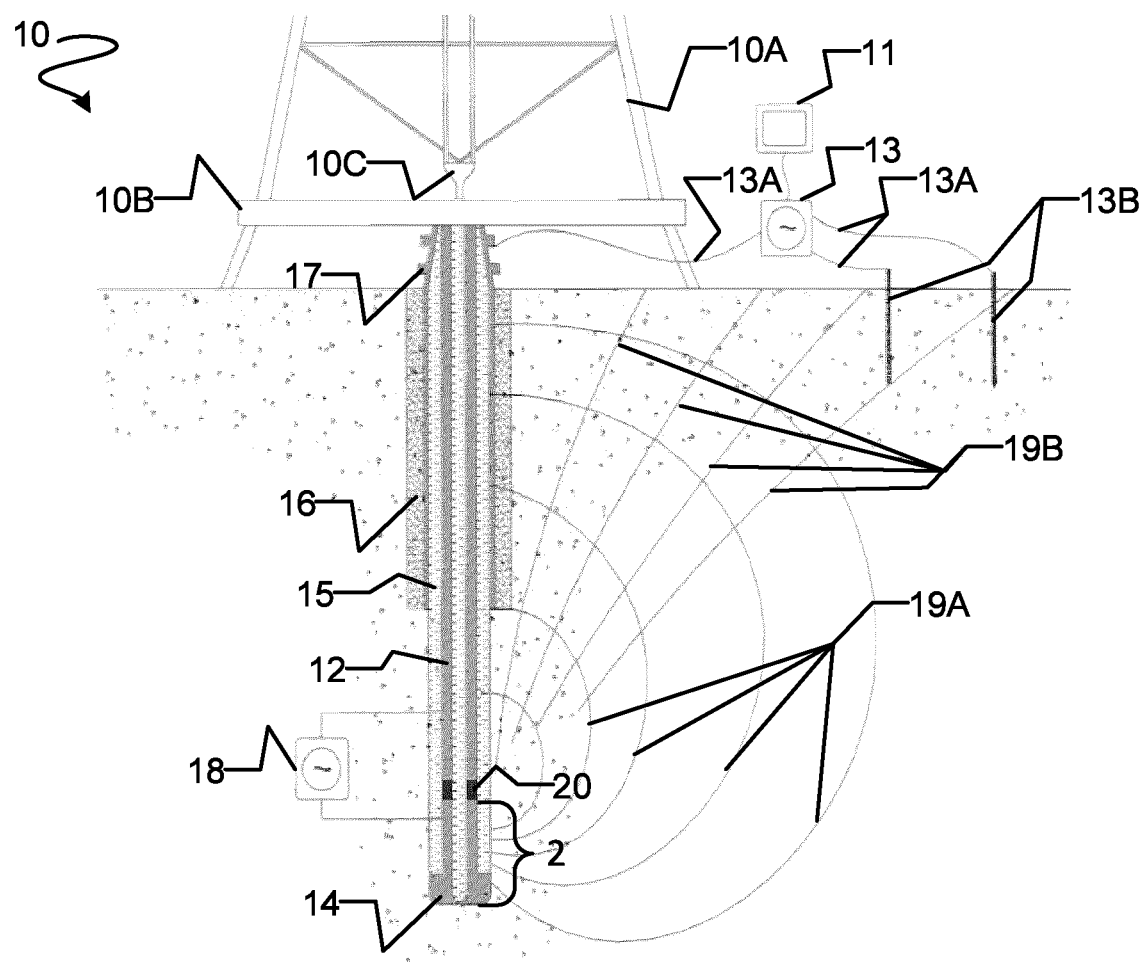
FIG. 1 is a schematic view of a drilling operation.
Figure 6:
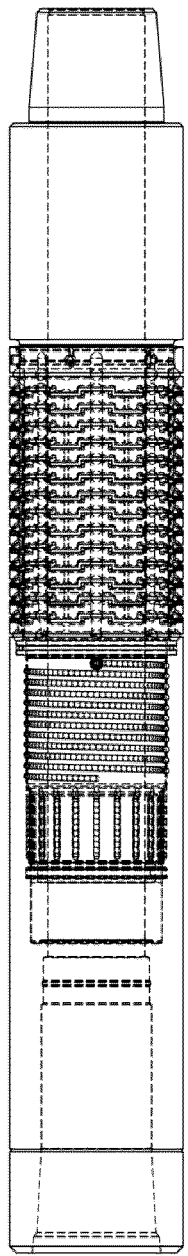
FIG. 6 is a perspective view of an exemplary gap sub assembly.
Figure 7:
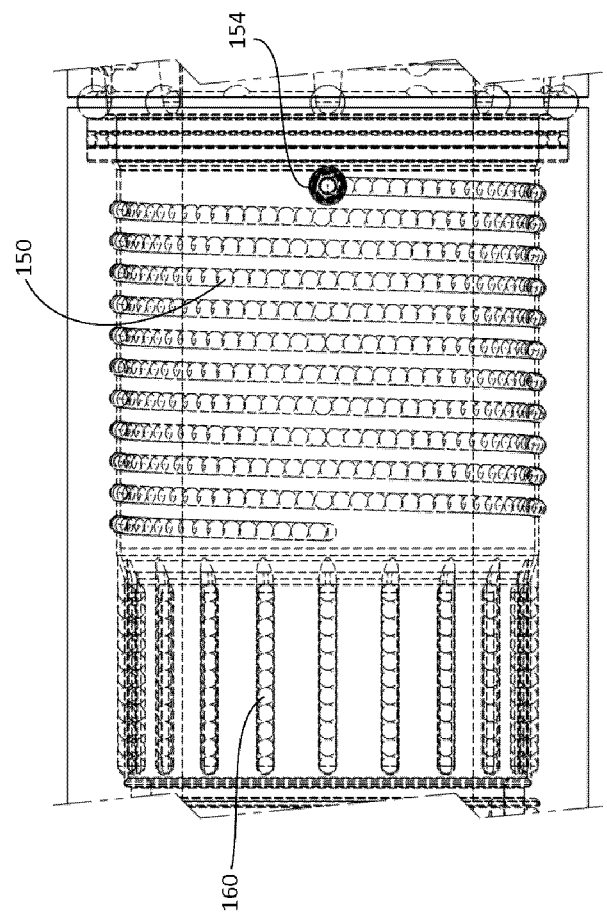
FIG. 7 is a detail view of a portion of an exemplary gap sub assembly, wherein the female part is depicted as translucent.

FIG. 1 shows schematically an example drilling operation. A drill rig 10 drives a drill string 12 which includes sections of drill pipe that extend to a drill bit 14. The illustrated drill rig 10 includes a derrick 10A, a rig floor 10B and draw works 10C for supporting the drill string. Drill bit 14 is larger in diameter than the drill string above the drill bit. An annular region 15 surrounding the drill string is typically filled with drilling fluid. The drilling fluid is pumped through a bore in the drill string to the drill bit and returns to the surface through annular region 15 carrying cuttings from the drilling operation. As the well is drilled, a casing 16 may be made in the well bore. A blow out preventer 17 is supported at a top end of the casing. The drill rig illustrated in FIG. 1 is an example only. The methods and apparatus described herein are not specific to any particular type of drill rig.

One or more gap subs 20 may be positioned at desired locations along drill string 12, for example, at the top of BHA 2. Gap sub 20 provides electrical isolation between two electrically-conductive parts of the drill string respectively located above and below the gap sub. The two parts form a dipole antenna structure. For example, one part of the dipole may be made of BHA 2 up to the electrically insulating gap sub and the other part of the dipole may be made up of the part of the drill string extending from the gap sub toward the surface.

A very low frequency alternating current (AC) electrical signal 19A is generated by an EM telemetry signal generator 18 and applied across gap sub 20. The low frequency AC signal energizes the earth and creates an electrical field 19B which results in a measurable voltage differential at a telemetry receiver. The voltage differential may, for example, be between the top of drill string 12 and one or more grounded electrodes 13B (such as ground rods or ground plates). Electrical signal 19A is varied in a way which encodes information for transmission by telemetry.

Some aspects disclosed herein provide improved gap sub assemblies. Some gap sub assemblies disclosed herein provide improved characteristics for resisting torques, axial forces and/or bending moments. Some gap sub assemblies disclosed herein provide reduced potential for leaking (e.g. have fewer openings for receiving electrically-insulating bodies) and are easier to assemble. Other aspects disclosed herein provide methods for manufacturing gap sub assemblies. Some methods for manufacturing gap sub assemblies disclosed herein provide systems for more efficient installation of electrically-insulating bodies. These aspects may be applied individually or in combination.

The gap sub assembly embodiments described herein generally relate to gap sub assemblies that may be used for EM telemetry in downhole drilling. In some embodiments the gap sub assembly comprises a female part comprising a female mating section and a male part comprising a male mating section and a gap section. The male mating section is matingly received within the female mating section and electrically isolated therefrom. The gap section is electrically insulating overall.

In some embodiments, a collar is positioned on the gap section and supported between two parts of the gap sub assembly. Any suitable type of collar may be employed in conjunction with the gap sub described herein. For example, in some embodiments, the collar may comprise one or more members that extend circumferentially around the gap sub and are supported by a plurality of discrete bodies. Various examples of such collars are described in WO 2014/075190. The circumferential members may comprise rings. In a non-limiting example embodiment, the rings are metal rings and the discrete bodies comprise ceramic spheres. The rings and discrete bodies may be embedded in an electrically-insulating material. The rings may be shaped to provide recesses to receive the discrete bodies.

The collar therefore electrically isolates the male part from the female part. The male part, female part and insulating collar function as the "gap sub" for EM telemetry. The male part and female part may each comprise a suitable coupling (e.g. an API standard threaded coupling) for coupling the gap sub to uphole and downhole parts of the drill string.

It is desirable to provide gap subs that are designed in a way that facilitates manufacture and also provides good electrical insulation between uphole and downhole ends of the gap sub. In some embodiments a gap sub is made by placing a collar between male and female parts and then mating the male and female parts. Once the collar is positioned on the gap section, the female part can be mated with the male part to form the gap sub assembly. Where the collar will be compressively pre-loaded then, depending on the mechanism for applying the pre-loading, the pre-loading may be performed before, after or as part of the mating of the male section to the female section. A suitable dielectric material may then be applied to fill the spaces around the collar.

Providing a collar that is compressed can increase resistance of the gap section to bending. Essentially, the collar may carry forces between shoulders of the male and female parts thereby resisting bending of the gap sub. The collar functions in place of solid material that would be present in a section of drill string lacking a gap section. A gap section which includes a collar may approximate the resistance to bending of an equivalent section of drill string. In some embodiments, the section of drill string having a collar has a Young's modulus which can be greater than and, in different example embodiments, is at least 150%, 120%, 110%, 100%, 99%, 95%, 90%, 80%, 70%, or 50% of the Young's modulus of an equivalent section of drill string that does not have a gap section. An equivalent section of drill string may comprise a section of drill string with the same material, outer diameter and bore diameter as the gap sub assembly but made of solid metal.

A female part of a gap sub may be mated to the male part of a gap sub in various ways. For example, the male part may be held to the female part by providing electrically-insulating bodies (e.g. spheres) that engage grooves or other indentations in the male part and female part. The electrically-insulating bodies may be inserted into a gap through apertures in the male or female part. Example embodiments having this construction are discussed below and illustrated in FIGS. 2-18.

One aspect of the invention provides a torsion-resistant gap sub 120. Gap sub 120 comprises a male part 130 and a female part 140. In some embodiments, a collar 170 is supported between male part 130 and female part 140. Male part 130 comprises two sets of grooves 134, 136 in the surface of mating part 138. Female part 140 comprises two corresponding sets of grooves 144, 146 in the surface of mating part 148.

Grooves 134, 144, may interact with electrically-insulating bodies to secure male part 130 longitudinally (axially) in the mated relationship relative to female part 140 while grooves 136, 146 may interact with other electrically-insulating bodies to secure male part 130 torsionally in the mated relationship relative to female part 140. It should be understood that a gap sub may be made with grooves like grooves 134, 144 and some torque-resisting arrangement not involving grooves 136, 146 and that a gap sub may be made with grooves 136, 146 and some arrangement other than grooves 134, 144 may be provided for securing male part 130 axially relative to female part 140.

Grooves 134, 144 may be helical or circumferential and are configured to receive one or more electrically-insulating bodies. In the illustrated embodiment grooves 134, 144 are helical. This is advantageous as the helical grooves provide one way to pre-load a collar (as described in more detail elsewhere herein).

Figure 8:
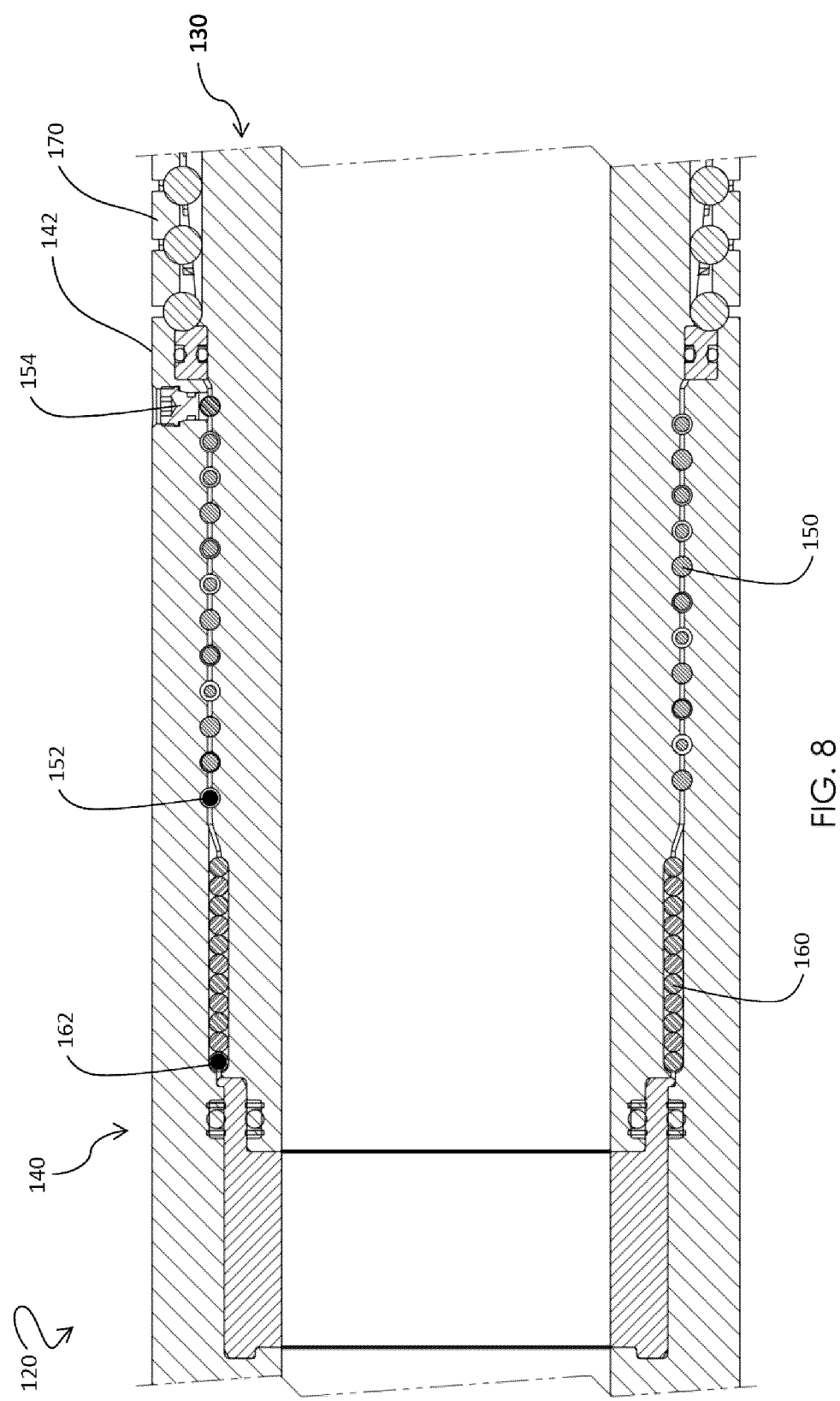
FIG. 8 is a cross-section of an exemplary gap sub assembly, wherein the female part is depicted as translucent.

In the illustrated embodiment the electrically-insulating bodies comprise spheres 150. For example, spheres 150 may be fed through an opening 154 into a space 152 which spans between grooves 134, 144. Opening 154 may be located at a first end of helical grooves 134, 144. As spheres 150 are introduced into opening 154, spheres located in space 152 are pushed toward a second end of helical grooves 134, 144. Opening 154 may be capped or closed after spheres 150 have been inserted. Opening 154 may comprise a fill port, as will be described in more detail below. As depicted in FIG. 8, opening 154 may be located in female part 140. Alternatively, an opening or aperture could be located in male part 130, thus requiring spheres 150 to be inserted from within the bore of gap sub 120.

Grooves 134 may wind around the exterior circumference of mating part 138 multiple times and grooves 144 may wind around the interior circumference of mating part 148 multiple times. Increasing the number of windings of grooves 134, 144 around mating parts 138, 148 provides additional rigidity and strength in the mating connection between male part 130 and female part 140. In some embodiments, grooves 134, 144 wind around mating parts 138, 148 between one and three times, in other embodiments, grooves 134, 144 wind around mating parts 138, 148 more than three times. The number of windings may be based at least in part on the required strength of the coupling joint and/or the strength of the insulating bodies. Two or more sets of grooves 134, 144 may be provided in some embodiments.

As illustrated in FIG. 2, female part 140 comprises shoulder 142 and male part 130 comprises shoulder 132. A gap between shoulders 132 and 142 may be filled with a material or structure that is electrically insulating. In the current example embodiment the gap is filled with a collar 170 that provides a framework to support an electrically-insulating material that fills gaps in the collar.

It can be appreciated that with spheres 150 in place, as described, twisting female part 140 with respect to male part 130 will result in shoulder 132 moving axially relative to shoulder 142. Thus collar 170 may be axially compressed between shoulders 132 and 142 by such rotation. The amount of compression can be adjusted by rotating male part 130 more or less in relation to female part 140. Axially compressing collar 170 may be advantageous, as described above.

In some embodiments, axial compression of collar 170 is provided by a threaded ring 137 that can be turned to adjust its own position relative to the position of shoulder 132 on male part 130 and relative to the position of shoulder 142 on female part 140. The threaded ring may engage threads on male part 130 or female part 140. In some embodiments the threads comprise acme threads.

FIGS. 2 and 3 depict example embodiments which include a threaded ring 137 threadedly engaged with male part 130. By adjusting the position of threaded ring 137 relative to shoulder 132 and shoulder 142 (i.e. rotating threaded ring 137 relative to male part 130), compression of collar 170 may be increased or decreased. For example, if threaded ring 137 is located on male part 130, adjacent shoulder 132 and opposed from shoulder 142 and is adjusted toward shoulder 142, axial compression of collar 170 is increased. Conversely, if threaded ring 137 is located on female part 140, adjacent shoulder 142 and opposed from shoulder 132 and is adjusted toward shoulder 132, axial compression of collar 170 is increased.

Adjacent turns of grooves 134, 144 can be spaced apart by various distances. As the spacing between adjacent turns of grooves 134, 144 decreases, a greater number of spheres 150 can be inserted in a fixed length of gap sub. Increasing the number of spheres 150 decreases the stress on each individual sphere 150 but may weaken section 138A due to the reduction of material in section 138A. The spacing between turns may be determined at least in part by cost effectiveness, strength of spheres 150, a need to prevent shearing of grooves 134, 144 and a desire to allow material injected into the gap to fill all spaces within gap. In some embodiments, the spacing distance is greater or equal to the width of grooves 134, 144.

Grooves 134, 144 can have various cross-sectional shapes. Grooves 134, 144 may have any of at least the following cross-sections: rounded, circle segment, angular, rectangular, square, trapezoidal and triangular.

Spheres 150 can have any suitable diameter. Typically, all spheres 150 are of the same size, although this is not mandatory. Spheres 150 may be sized and shaped to correspond with the cross-sectional shapes of grooves 134, 144. The size of spheres 150 may be based at least in part on one or more of the cost of spheres 150, the shear strength of spheres 150, the size of the gap sub and the potential presence of defects in spheres 150.

Spheres 150 (or other bodies for insertion into grooves 134,144) may be made of an electrical insulator material, for example, but not limited to, ceramic, plastic, plastic coated metals, composite or carbides. Exemplary ceramics include, but are not limited to, zirconium dioxide, yttria tetragonal zirconia polycrystal (YTZP), silicon carbide, or composites. In other embodiments, spheres 150 are made of a metal or metal alloy, for example, but not limited to, copper, copper alloys, aluminium or stainless steel. In embodiments where spheres 150 are not themselves electrically-insulating one or more electrical insulators are provided such that overall the gap provides electrical isolation of male part 130 from female part 140. For example, if spheres 150 are made of a metal or metal alloy, an additional coating, such as a ceramic coating, on spheres 150 may be provided to aid in electrically isolating male part 130 from female part 140.

Longitudinal grooves 136, 146 may be located so that a groove 136 is axially aligned with a corresponding groove 146 when collar 170 has been pre-loaded in compression to a desired amount. With grooves 136 and 146 so aligned, electrically-insulating bodies may be introduced into a space 162 that spans between a groove 136 and the corresponding groove 146. In the currently illustrated embodiment these electrically-insulating bodies comprise spheres 160. The spheres 160 may be introduced, for example, by way of openings that may be capped or closed after the spheres 160 are in place. The openings may be located in female part 140. Alternatively, one or more openings could be located in male part 130 in which case spheres 160 may be inserted from within gap sub 120. In other embodiments, the spheres or other electrically-insulating bodies may be loaded into grooves 136 or 146 before male part 130 is inserted into female part 140. In such other embodiments, openings 154 are optional.

By inserting spheres 160 or other bodies into space 162 spanning indentations (e.g. grooves 136, 146) in the male and female parts 130, 140, male part 130 is secured torsionally in relation to female part 140. Securing male part 130 and female part 140 torsionally ensures that the desired amount of pre-loading is maintained, that male part 130 is not able to unthread from female part 140 and that the torsional rigidity of drill string 12 is not unduly compromised by gap sub 120. Spheres 160 also provide additional electrical insulation between male part 130 and female part 140.

Longitudinal grooves 136, 146 may be of any suitable length. In some embodiments, all grooves 136, 146 are the same length. In other embodiments, grooves 136, 146 may be of various lengths. Increasing the length of grooves 136, 146 allows for additional spheres 160 to be inserted in grooves 136, 146 thereby reducing the stress on each individual sphere 160. Decreasing the length of grooves 136, 146 reduces manufacturing costs and time.

Adjacent grooves 136, 146 can be spaced apart by various distances. As the circumferential (angular) spacing between adjacent grooves 136, 146 decreases, a greater number of spheres 160 can be inserted in a fixed length of gap sub. Increasing the number of spheres 160 decreases the stress on each individual sphere 160 but may weaken section 138B due to the reduction of material in section 138B. The circumferential spacing between adjacent grooves 136, 146 may be determined at least in part by cost effectiveness, strength of spheres 160, a need to prevent shearing of grooves 136, 146 and a desire to allow material injected into the gap to fill the gap. In some embodiments, the spacing distance is greater or equal to the width of grooves 136, 146.

Grooves 134, 144 and grooves 136, 146 can have various cross-sectional shapes. In some embodiments, grooves 134, 144 and grooves 136, 146 have the same cross-sectional shape, but this is not necessary. Like grooves 134, 144, grooves 136, 146 may have any of at least the following cross-sections: rounded, circle segment, angular, rectangular, square, trapezoidal and triangular.

Spheres 160 may be sized to correspond with the cross-sectional shapes of grooves 136, 146. Spheres 150 and 160 may be of the same or different sizes and materials. The size of spheres 160 may be based at least in part on one or more of the cost of spheres 160, the shear strength of spheres 160, the size of the gap sub and the potential presence of defects in spheres 160.

Spheres 160 may be made of any of the materials suitable for spheres 150. In some embodiments, spheres 150 and 160 are made of the same material. In other embodiments spheres 150 and 160 are made of different materials.

In some embodiments, spheres 150 and/or spheres 160 may be replaced by non-spherical discrete bodies that correspond to the shape of grooves 134, 144 and grooves 136, 146, respectively.

In some embodiments, mating part 138 does not have a consistent outer diameter. Mating part 138 may comprise two or more sections wherein each section has a different diameter. For example, mating part 138 may comprise a first section 138A having a first diameter and a second section 138B having a second diameter. First section 138A may correspond with the section of mating part 138 into which grooves 134 are arranged. Second section 138B may comprise the section of mating part 138 into which grooves 136 are arranged. The diameter of first section 138A may be greater than the diameter of second section 138B, as is illustrated in FIG. 2. In other embodiments, the diameter of mating part 138 may taper along its length. In other embodiments, the diameter of mating part 138 may be the same along its length.

Similarly, mating part 148 of female part 140 may comprise corresponding sections, wherein each section has a different internal bore diameter. For example, mating part 148 may have a first section 148A having a first internal bore diameter and a second section 148B having a second internal bore diameter. First section 148A may comprise the section of mating part 148 into which grooves 144 are arranged. Second section 148B may comprise the section of mating part 148 into which grooves 146 are arranged. The internal bore diameter of first section 148A may be greater than the internal bore diameter of second section 148B, as is illustrated in FIG. 2. This feature of having varying diameters may be called the "stepped joint" feature.

The outer diameter of first section 138A may be slightly less than the internal bore diameter of the first section 148A while the outer diameter of the second section 138B may be slightly less than the internal bore diameter of the second section 148B so as to create a gap between male part 130 and female part 140. In particular embodiments, for example, the outer diameter of first section 138A is approximately 2-10 mm less than the internal bore diameter of first section 148A while the outer diameter of the second section 138B is approximately 2-10 mm less than the internal bore diameter of the second section 148B. The gap between the internal bore of first section 148A and the external diameter of first section 138A can be filled with a suitable high dielectric material 141 (see e.g. FIG. 3) as described in more detail below.

The stepped joint feature may simplify installation of the gap sub as it can allow for anti-torque elements, such as spheres 160, to be installed before mating male part 130 to female part 140. In particular embodiments, where the internal bore diameter of section 148A is greater than the sum of the outer diameter of section 138B and the protruding portions of spheres 160, it is possible to insert spheres 160 into grooves 136 before inserting male part 130 into female part 140, thereby obviating the need for openings 154. Due to the different diameters of sections 138A, 138B and corresponding sections 148A, 148B, spheres 160 inserted into grooves 136 before mating can pass by grooves 144 as male part 130 is inserted into female part 140.

It is advantageous to be able to install spheres 160 before inserting male part 130 into female part 140. In this way, spheres 160 can be installed without the need to provide a fill port for each of grooves 146 or to feed spheres 160 one-by-one into grooves 146. This reduces manufacturing time and costs in constructing gap sub 120. Reducing or eliminating openings 154 reduces the possibility of leaking in gap sub 120 and thereby increases reliability.

When inserting spheres 160 into grooves 136, it is beneficial to secure them in place around male mating part 138 before inserting male part 130 into female part 140. Securing spheres 160 in place around male mating part 138 simplifies installation because all spheres 160 can be pre-assembled and installed together as described below. Spheres 160 can be secured in place using various apparatus and methods. For example, spheres 160 can be secured in place using an adhesive, a torsional channel ball ring, a torsional channel scarf or torsional channel pods, as described below.

In some embodiments, spheres 160 are secured in place in grooves 136 using an adhesive. Each sphere 160 may be bonded in place in one of grooves 136 using an adhesive such as a suitable cement, glue or epoxy. The adhesive may be first applied to grooves 136 or to spheres 160. In other embodiments, spheres 160 are bonded to one another using an adhesive. Alternatively, spheres 160 may be attached together using a rod or wire that passes through the centers of spheres 160, like beads on a string.

Figure 9:
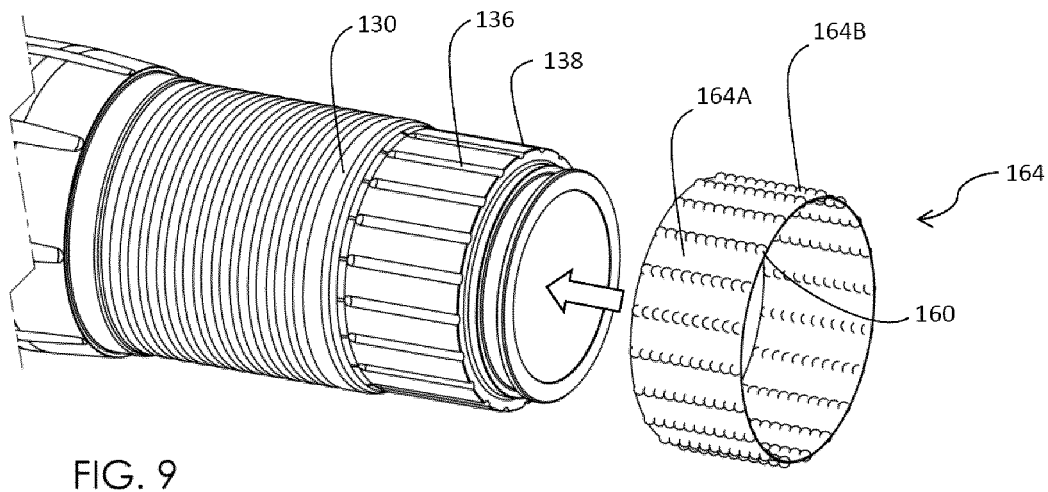
FIG. 9 is a perspective view of an exemplary torsional ball channel ring being installed on a portion of an exemplary gap sub assembly.
Figure 10:
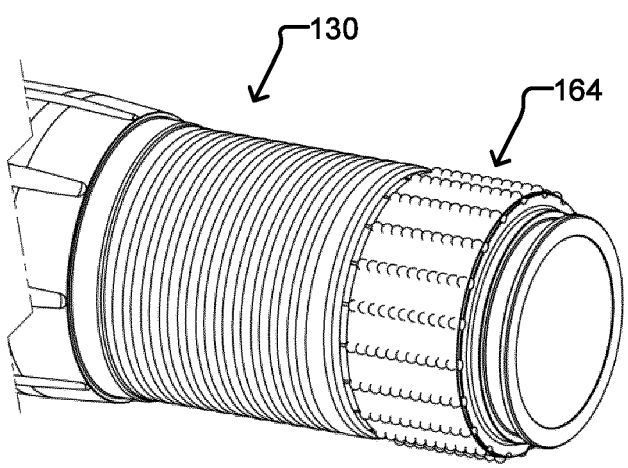
FIG. 10 is a perspective view of an exemplary torsional ball channel ring installed on a portion of an exemplary gap sub assembly.

In some embodiments, spheres 160 are secured in place using a torsional channel ball ring 164, as illustrated in FIGS. 9 and 10. Torsional channel ball ring 164 may comprise a ring-shaped support structure 164A for retaining spheres 160. Support structure 164A may comprise an injected plastic, epoxy or another suitable material. Support structure 164A comprises a plurality of channels 164B that receive spheres 160. As illustrated in FIG. 9, spheres 160 are retained in channels 164B and are organized in a plurality of columns. Each column corresponds to one of the plurality of pairs of grooves 136, 146 formed into mating parts 138, 148. Each of the plurality of columns of spheres 160 is spaced apart from adjacent columns by the same spacing as between adjacent grooves 136 or adjacent grooves 146.

In some embodiments, spheres 160 are retained in channels 164B entirely by channels 164B while in other embodiments, spheres 160 are retained in channels 164B by a combination of grooves 136 and channels 164B or grooves 146 and channels 164B. In particular, channels 164B may be partially or completely open toward the interior of torsional channel ball ring 164, may have an opening toward the exterior of torsional channel ball ring 164 or may have one or more openings along one or more of the edges of torsional channel ball ring 164. As such, spheres 160 may be inserted into channels 164B before or after torsional channel ball ring 164 is installed around mating part 138. In other embodiments, spheres 160 and torsional channel ball ring 164 are together placed in a mold and bonded together to create a single assembly.

Each channel 164B contains one or more spheres 160. The number of spheres 160 in each channel 164B is less than or equal to the length of the groove 136, 146 divided by the diameter of a sphere 160.

Once torsional ball channel ring 164 and spheres 160 are installed onto mating part 138, mating part 138 may be inserted into mating part 148. Mating part 138 is aligned so that grooves 136 align with grooves 146 of mating part 148. In this way, mating part 138 may be completely inserted into mating part 148 and male part 130 is secured torsionally relative to female part 140.

Using torsional ball channel ring 164 increases the ease and speed of installing and securing male part 130 in female part 140. Since torsional ball channel ring 164 remains between male part 130 and female part 140, it may also improve electrical isolation of male part 130 from female part 140 and eliminate any potential fluid paths from developing around spheres 160.

Support structure 164A may be relatively thin. In some embodiments, support structure 164A is between 0.5 mm and 5 mm in thickness. The thickness of support structure 164A may be constant throughout or may vary. The diameter of spheres 160 may be reduced and/or the cross-sectional area of grooves 136, 146 may be increased to accommodate support structure 164A and thereby maintain appropriate clearance between male part 130 and female part 140. In some embodiments, support structure 164A is thick enough to fill the radial gap in channels 164B while, in other embodiments, support structure 164A is thin enough to allow for additional injected plastic to travel the full length of channel 164B.

In some embodiments, spheres 160 are secured in place using a torsional channel ball scarf 166. Torsional channel ball scarf 166 may comprise a support structure 166A for retaining spheres 160. Support structure 166A may comprise a flexible, generally rectangular, strip having a plurality of channels 166B. Torsional ball scarf 166 may be installed by wrapping it around mating part 138. Support structure 166A may comprise an injected plastic, epoxy, woven or nonwoven fabric, or another suitable material. Support structure 166A supports columns of spheres 160. In the illustrated embodiment, channels 166B receive spheres 160. As illustrated in FIG. 11, spheres 160 are arranged in channels 166B so as to provide a plurality of columns. Each column corresponds to one of the plurality of pairs of grooves 136, 146 formed into mating parts 138, 148. Each of the plurality of channels 166B of spheres 160 is spaced apart from adjacent channels 166B by the same spacing as adjacent grooves 136 or adjacent grooves 146. In other embodiments, spheres 160 and torsional channel ball scarf 166 are together placed in a mold and bonded together to create a single assembly.

In some embodiments, spheres 160 are retained in channels 166B entirely by channels 166B while in other embodiments, spheres 160 are retained in channels 166B by a combination of grooves 136 and channels 166B. In particular, channels 166B may be partially or completely open toward the interior of torsional channel ball scarf 166, may have an opening toward the exterior or torsional channel ball scarf 166 or may have one or more openings along one or more of the edges of torsional channel ball scarf 166. As such, spheres 160 may be inserted into channels 166B before or after torsional channel ball scarf 166 is wrapped around mating part 138.

Each channel 166B contains one or more spheres 160. The number of spheres 160 in each channel 166B is less than or equal to the length of the groove 136, 146 divided by the diameter of a sphere 160.

Once torsional ball channel scarf 166 and spheres 160 are installed onto mating part 138, mating part 138 may be inserted into mating part 148 of female part 140. Mating part 138 is aligned so that grooves 136 align with grooves 146 of mating part 148. In this way, mating part 138 may be completely inserted into mating part 148 and male part 130 is secured torsionally relative to female part 140.

Using torsional ball channel scarf 166 increases the ease and speed of installing and securing male part 130 in female part 140. Since torsional ball channel scarf 166 remains between male part 130 and female part 140, it may also improve electrical isolation of male part 130 from female part 140 and eliminate any potential fluid paths from developing around spheres 160.

Support structure 166A may be relatively thin and flexible so that it can be wrapped around mating part 138. In some embodiments, support structure 166A is between 0.5 mm and 5 mm in thickness. The thickness of support structure 166A may be constant throughout or may vary. Support structure 166A may include perforations or notches to improve flexibility. The diameter of spheres 160 may be reduced and/or the cross-sectional area of grooves 136, 146 may be increased to accommodate support structure 166A and thereby maintain appropriate clearance between male part 130 and female part 140. In some embodiments, support structure 166A is thick enough to fill the radial gap in between grooves 136, 146 while in other embodiments, support structure 166A is thin enough to allow for additional injected plastic to travel the full length of grooves 136, 146.

Figure 13:
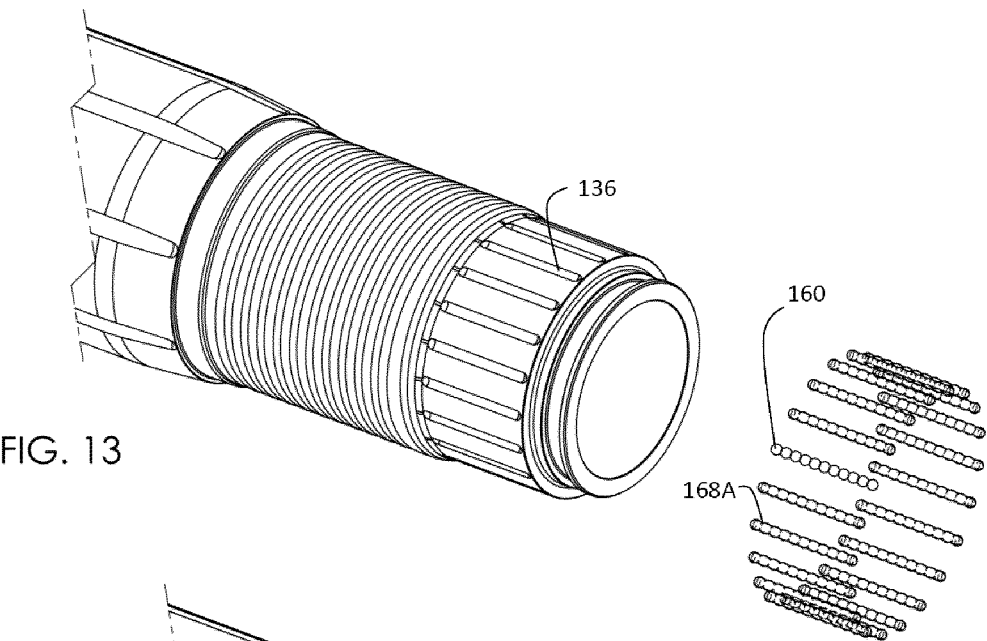
FIG. 13 is a perspective view of exemplary torsional ball channel pods being installed on a portion of an exemplary gap sub assembly.
Figure 14:
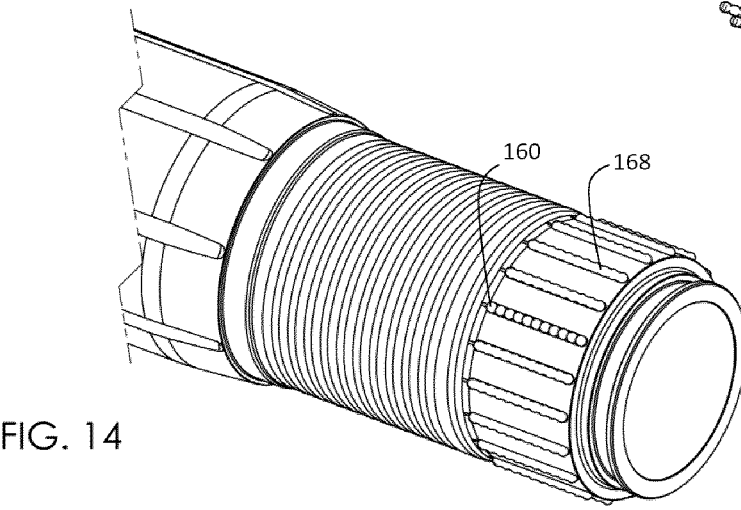
FIG. 14 is a perspective view of exemplary torsional ball channel pods installed on a portion of an exemplary gap sub assembly.
Figure 15:
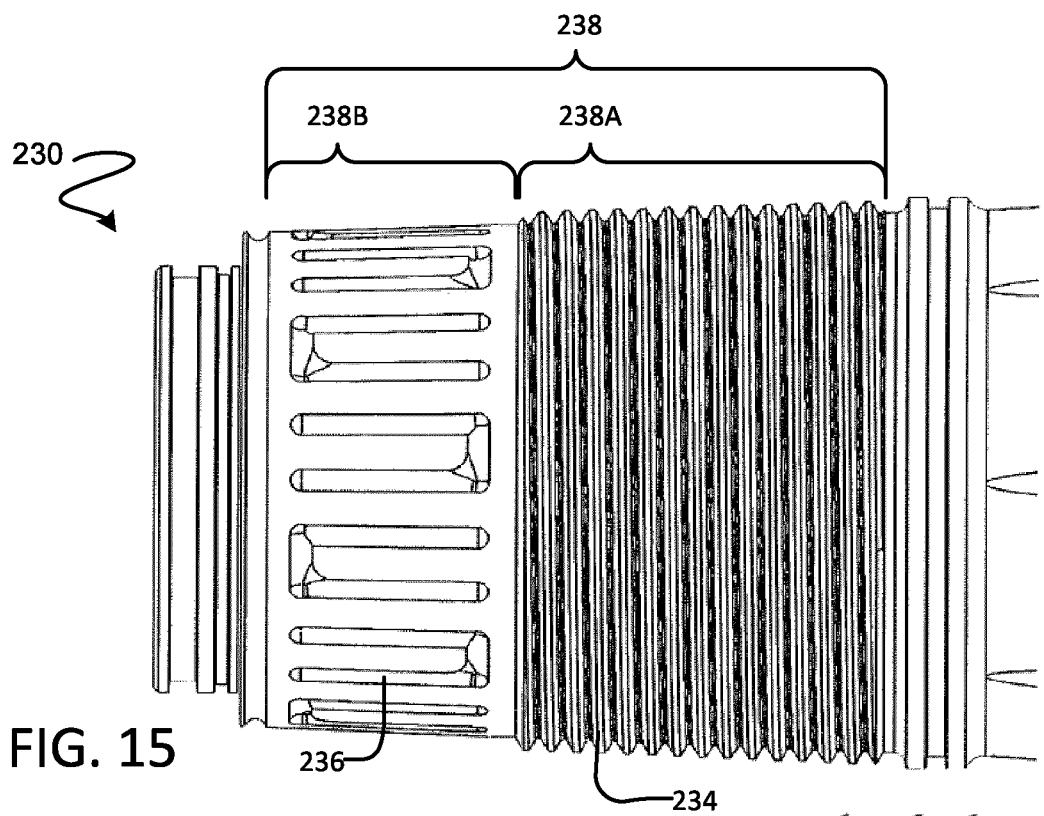
FIG. 15 is a side view of a portion of an exemplary gap sub assembly.

In some embodiments, spheres 160 are secured in place using a plurality of torsional channel ball pods 168, as depicted in FIGS. 13 and 14. Each torsional ball pod 168 comprises a tubular support structure 168A for retaining spheres 160 and corresponds to one of the plurality of pairs of grooves 136, 146. The number of spheres 160 in each torsional ball pod is less than or equal to the length of each of grooves 136, 146 divided by the diameter of spheres 160.

Support structure 168A may comprise an injected plastic, epoxy or another suitable material. Support structure 168A has a channel 168B that receive spheres 160. Channel 168B may open from a lengthwise side of support structure 168A or from an end of support structure 168A. Alternatively, support structure 168A comprises a heat-shrink material wrapped around spheres 160 and does not include any openings. In other embodiments, material may be molded around spheres 160. Spheres 160 are held in place by one or more retention features. The retention features may work in conjunction with one of grooves 136 or grooves 146 by sandwiching spheres 160 between the retention features and grooves 136 or grooves 146.

Torsional ball channel pods 168 may be separately installed into each of grooves 136, 146, as illustrated in FIG. 14. In practice, spheres 160 may be loaded into torsional ball channel pod 168 before a torsional ball channel pod 168 is installed on mating part 138, as depicted in FIGS. 13 and 14. Alternatively, in some embodiments, spheres 160 may be loaded into torsional ball pods 168 after torsional ball channel pods 168 are installed on mating part 138.

Torsional ball channel pods 168 may be installed into grooves 136 in any suitable manner, such as, for example, press fitting or bonding using adhesive. Once torsional ball channel pods 168 are installed onto mating part 138, mating part 138 may be inserted into mating part 148 of female part 140. Mating part 138 is aligned so that grooves 136 align with grooves 146 of mating part 148. In this way, male part 130 is secured torsionally relative to female part 140.

Using torsional ball channel pods 168 increases the ease and speed of installing and securing male part 130 in female part 140. Since torsional ball channel pods 168 remain between male part 130 and female part 140, they may also improve electrical isolation of male part 130 from female part 140 and eliminate any potential fluid paths from developing around spheres 160.

Support structure 168A may be relatively thin so that torsional ball channel pods 168 can be installed on mating part 138. In some embodiments, support structure 168A is between 0.5 mm and 5 mm in thickness. The thickness of support structure 168A may be constant throughout or may vary. The diameter of spheres 160 may be reduced and/or the cross-sectional area of grooves 136, 146 may be increased to accommodate support structure 168A and thereby maintain appropriate clearance between male part 130 and female part 140. In some embodiments, support structure 168A is thick enough to fill the radial gap in between groves 136, 146 while in other embodiments, support structure 168A is thin enough to allow for additional injected plastic to travel the full length of grooves 136, 146.

In some embodiments, whether using torsional ball ring 164, torsional ball scarf 166 or torsional ball pods 168, spheres 160 are not completely encompassed within support structure 164A, 166A, 168A but protrude past support structure 164A, 166A, 168A. In such embodiments, spheres 160 may contact one or both of grooves 136, 146 directly.

In some embodiments, channels 164B, 166B, 168B may be replaced with one or more sleeves for containing individual spheres 160. For example, one channel which could contain five spheres 160 could be replaced with five individual sleeves that each contains a single sphere 160. The one or more sleeves may be arranged adjacent each other so as to form a row of sleeves that together generally correspond to the same shape as the channel. Alternatively, the sleeves may each receive more than one sphere 160.

After male part 130 is secured torsionally within female part 140, spheres 150 may be inserted. Spheres 150 may be inserted through one or more openings 154. As additional spheres 150 are inserted into opening 154, spheres 150 are pushed along helical space 152 until they reach an end of helical grooves 134, 144. After the desired number of spheres 150 are installed, a cap or a plug may be installed in opening 154.

In some embodiments (e.g. gap sub 120), after the male part (e.g. male part 130) is secured to the female part (e.g. female part 140), a filler material may be injected in between the male and female parts to secure the spheres (e.g. spheres 150, 160) in place, fill any gaps, prevent fluid invasion and improve the electrical isolation provided by the gap sub.

A high dielectric, nonconductive material, such as, but not limited to, an injectable thermoplastic or epoxy or engineered resin may be injected into the radial gap between the external surface of the male mating section 138 and the internal surface of the female mating section 148. The injected dielectric material sets and electrically isolates the male mating section 138 from the female mating section 148, as well as preventing drilling fluid from filling the radial gap. The dielectric material may additionally help to attach male part 130 to female part 140.

To ensure that the dielectric material electrically isolates male mating section 138 from female mating section 148 and that any of a torsional ball ring 164, a torsional ball scarf 166 or one or more torsional ball pods 168 do not interfere with the injection of the dielectric material one or more systems or methods can be incorporated. For example, one or more conduits, leading to opposing sides of torsional ball ring 164, torsional ball scarf 166 or torsional ball pods 168 may be used to ensure that the dielectric material is able to access the surface of both male mating part 138 and female mating part 148. Alternatively, torsional ball ring 164 and torsional ball scarf 166 may include channels and apertures for allowing the injected dielectric material to flow around and through torsional ball ring 164 and torsional ball scarf 166. In other embodiments, the injected dielectric material is hot enough to melt torsional ball ring 164, torsional ball scarf 166 and/or torsional ball pods 168, and support structure 164A, 166A, 168A mixes with the injected dielectric material to isolate male mating section 138 from female mating section 148.

In some embodiments, support structure 166A or 168A comprises a cloth of woven or non-woven fibers such as carbon fiber or fiberglass. In such embodiments, injection of the dielectric material may impregnate the support structure. The support structure may enhance the strength of the injected dielectric material.

In some embodiments, injecting the dielectric material comprises injecting the dielectric material through one or more openings (such as openings 154) and applying suction to one or more suction openings away from openings 154 so as to draw the dielectric material into the space between male part 130 and female part 140. Suction openings may be provided in one or more locations at opposite ends of the gap between male part 130 and female part 140. In some embodiments, dielectric material is injected into gap sub 120 until superfluous dielectric material spills out of the suction openings. In this way, the injected dielectric material can fill the entire gap between male part 130 and female part 140.

FIGS. 15-18 depict another exemplary embodiment of a torsion resistant gap sub 220. Instead of helical grooves 134, 144, gap sub 220 has a threaded profile 234 on male part 230 and a corresponding threaded profile 244 on the corresponding female part 240.

Threaded profile 234, 244 may be tapered, although this is not necessary. It may be advantageous to provide a threaded profile since a threaded profile may better withstand various types of loading while in use. Threaded profile 234, 244 requires fewer parts and may also provide easier installation, less potential for air voids during injection (filling of gaps), simpler calculations of flow dynamics during injection, better sealing against fluid invasion and fewer fill ports for potential fluid invasion and manufacturing complexity.

Figure 16:
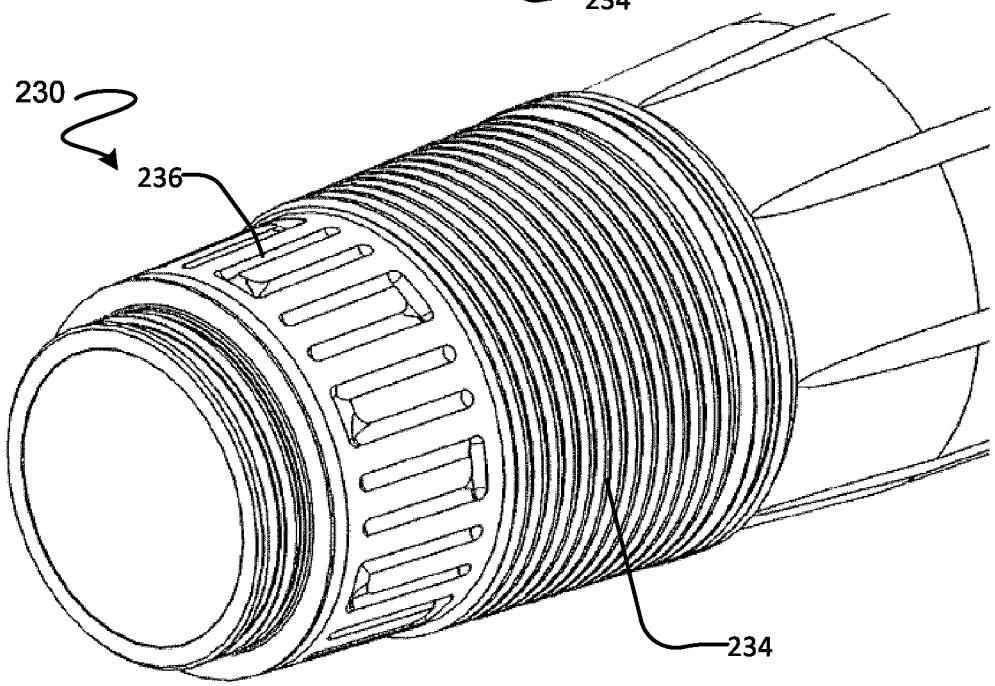
FIG. 16 is a perspective view of a portion of an exemplary gap sub assembly.
Figure 17:
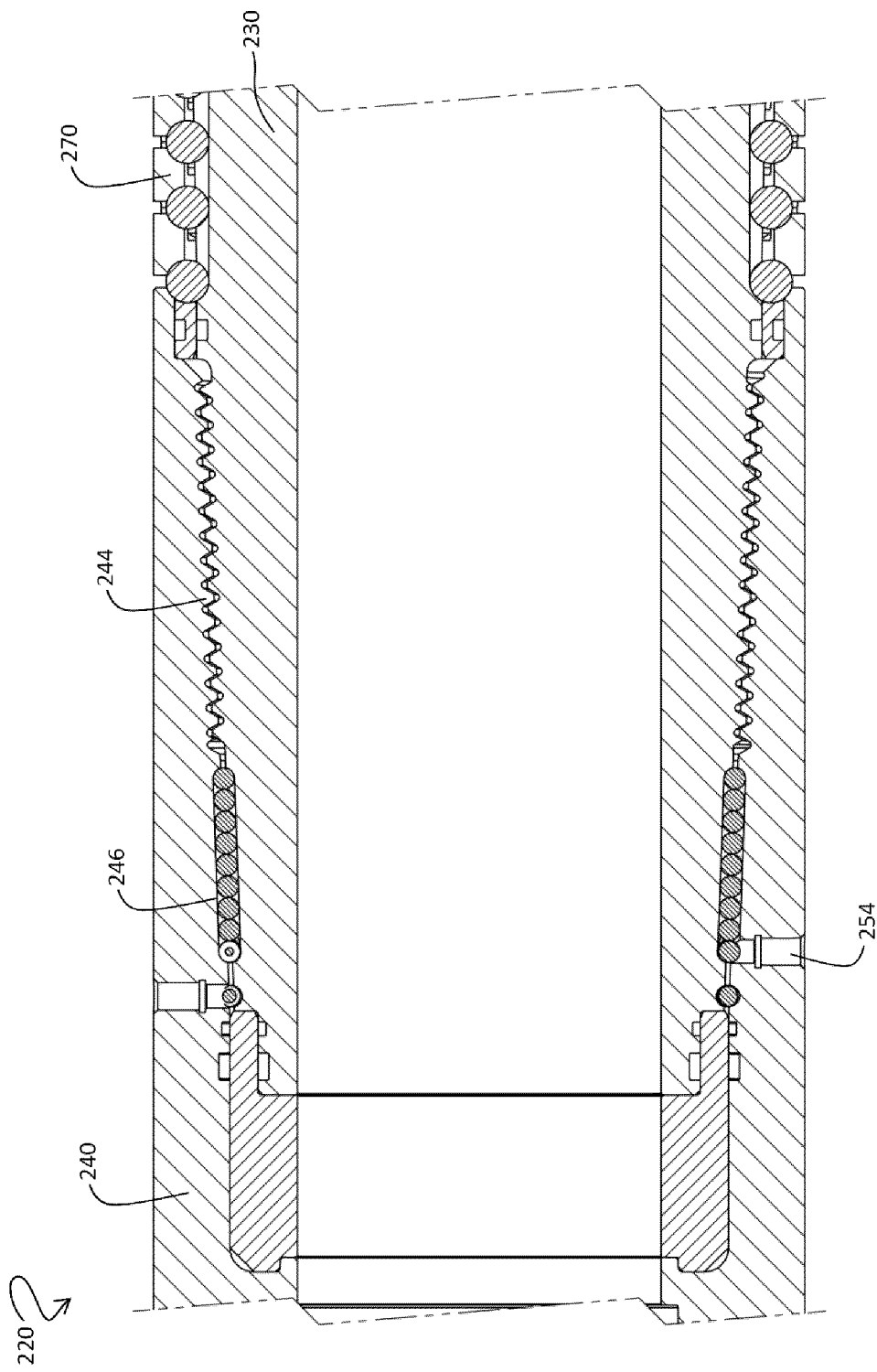
FIG. 17 is a cross-section of a portion of an exemplary gap sub assembly.
Figure 18:
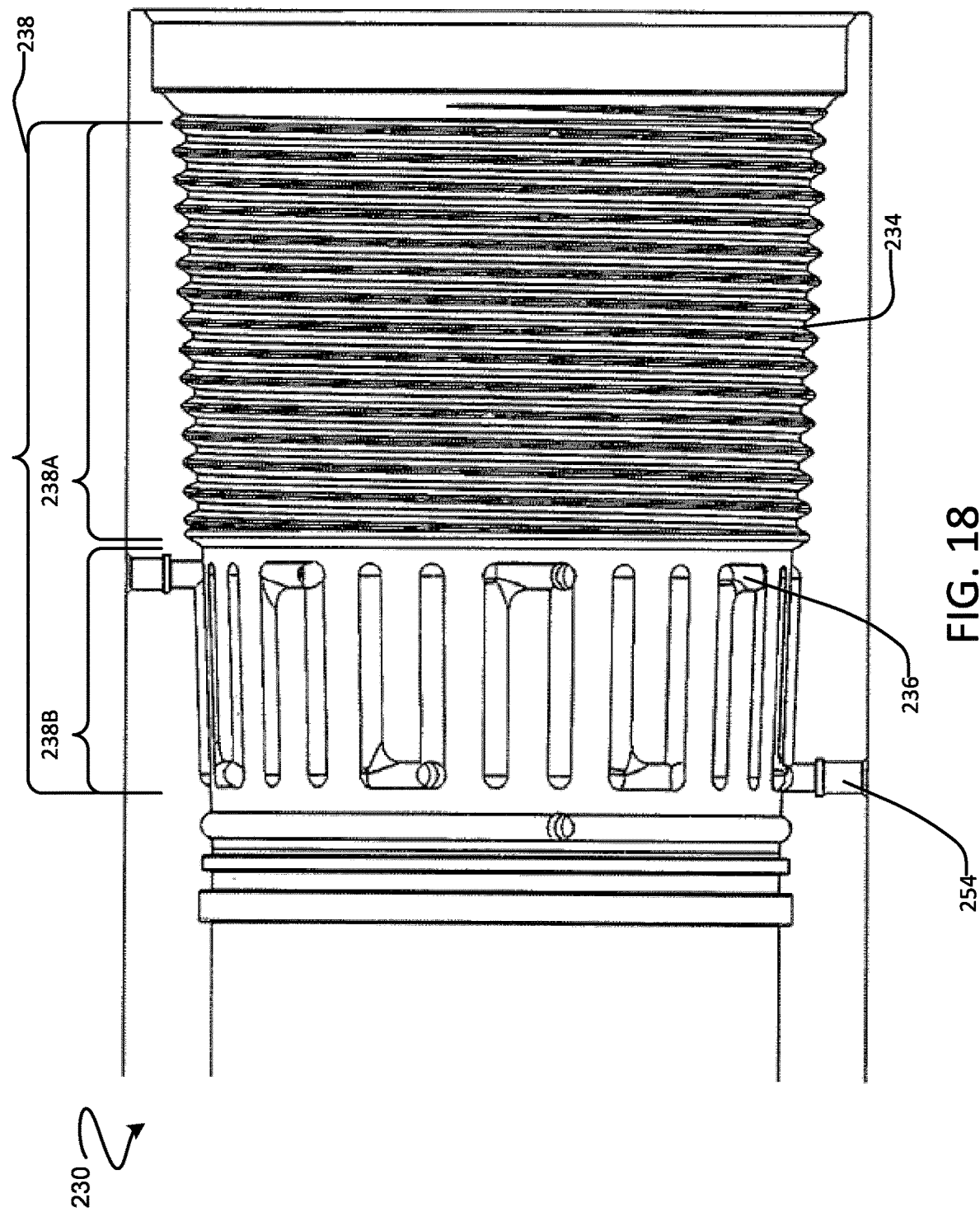
FIG. 18 is a detail view of a portion of an exemplary gap sub assembly.

In some embodiments, two or more longitudinal grooves may be joined together to form a single continuous groove, thereby reducing the number of openings required to install spheres into the longitudinal grooves. For example, male part 230 includes U-shaped grooves 236 instead of linear grooves 136. Spheres may be inserted into grooves 236 by way of one or more openings 254 in each U-shaped groove 236. The U-shape of each groove 236 reduces the number of openings 254 by half, as compared to embodiments using only straight grooves 136. In some embodiments, a plurality of U-shaped grooves 236 are provided around mating part 238, as illustrated in FIG. 16. U-shaped grooves may alternate in orientation around the circumference of mating part 238, such as is illustrated in FIGS. 16 and 18. In some embodiments, each U-shaped groove is connected to adjacent U-shaped grooves to provide a single groove around the circumference of mating part 238 which has multiple circumferentially spaced sections that extend generally axially. In other embodiments, each U-shaped groove is separate and requires a separate opening 254.

In other embodiments, U-shaped grooves 236 may be replaced by grooves of other shapes that are interconnected and incorporate at least some longitudinally oriented groove portions. For example, three longitudinal grooves could be connected together to form S-shaped grooves. S-shaped grooves would further reduce the number of openings 254 as compared to U-shaped grooves. In other embodiments, a plurality of S-shaped grooves could be interconnected to form one continuous groove with a single opening 254 for receiving spheres.

In some embodiments, since each groove 236, 246 is separate, a separate opening 254 is provided for each groove 236, 246. After inserting the desired number of spheres, each opening 254 is plugged using a fill plug in order to avoid invasion of fluids into gap sub 220.

In order to electrically isolate male part 230 from female part 240, a high dielectric, nonconductive material may be injected into a gap between the external surface of the male part 230 and the internal surface of the female part 240. The injected dielectric material sets and electrically isolates male part 230 from the female part 240, as well as preventing drilling fluid from filling the radial gap. The dielectric material may additionally help to attach male part 230 to female part 240.

Another aspect of the invention provides a gap sub assembly substantially similar to gap sub assembly 120 except that grooves 136, 146 are helical and grooves 134, 144 are longitudinal. In such an embodiment, spheres or other bodies may be installed into the helical grooves before the male part is inserted into the female part. The spheres may be held in place by a ball scarf, a ball ring or a helical ball pod similar to those disclosed above except that they only have a single helical channel for retaining the spheres. With the spheres held in place, the male part is rotated relative to the female part as they are mated to achieve the desired amount of pre-load compression on the collar. After the desired amount of pre-load compression is obtained, spheres or other suitable bodies are inserted into the longitudinal channels by way of openings to maintain the pre-load and stop relative rotation between the male and female parts.

After installing spheres (e.g. spheres 150, 160), it is typically desirable to close off the interior of the gap sub so as to prevent the invasion of fluid into gap sub 120. A fill plug 180 may be inserted in to an opening to secure spheres within the gap sub. Fill plug 180 may be of a corresponding size and shape to snugly fit within the opening. In some embodiments, the opening and fill plug 180 are circular in cross section. Fill plug 180 may comprise an internal channel for allowing a dielectric material to be injected into the gap sub, as described above. After the dielectric material sets, the internal channel of fill plug 180 may be blocked by the dielectric material to prevent any fluids from entering the gap sub.

It is generally preferred that fill plug 180 comprises a soft material that can be deformed to provide a snug fit within a corresponding opening without damaging the opening or the gap sub generally. Fill plug 180 may comprise various materials such as plastic.

Fill plug 180 may comprise one or more o-rings 182 for providing a resilient seal in an opening, as depicted in FIG. 19A. Traditionally, no lubricant is used in installing a plastic fill plug since lubricant is a contaminant that can lead to incomplete injection. However, without lubricant, it may be difficult to obtain a tight fit and good seal in the opening without damaging the O-ring during installation.

Another aspect of the invention provides an intermediate plug 190 for closing openings (e.g. openings 154, 254) and improving the seal of fill plug 180. To stop lubricant from contaminating the internal gap, intermediate plug 190 may be inserted between the last sphere and fill plug 180 to which the lubricant is applied.

Intermediate fill plug 190, like fill plug 180 may comprise an internal channel for allowing dielectric material to be injected into the gap sub. In some embodiments, the internal channel of intermediate fill plug 190 is shaped to receive and thereby extend the internal channel of fill plug 180 so that dielectric material can be injected through both intermediate fill plug 190 and fill plug 180.

In some embodiments, intermediate plug 190 is installed before fill plug 180 is installed while in other embodiments, intermediate plug 190 is an integral part of fill plug 180. In some embodiments, intermediate fill plug 190 takes the place of the last sphere in the internal gap, while in other embodiments, intermediate fill plug 190 envelopes a portion of the last sphere and secures the last sphere in place.

Intermediate plug 190 provides a barrier which blocks any lubricant from travelling from fill plug 180 into the internal gap, as illustrated in FIG. 19B. As such, lubricant can be applied to the o-rings 182 that form part of fill plug 180. It is advantageous to provide lubricant when installing fill plug 180 since it will ease installation and ensure that o-rings 182 are not damaged during installation, thereby providing a better seal to stop fluid invasion into the gap sub. Intermediate plug 190 may comprise plastic or another soft material so as not to damage grooves (e.g. grooves 134, 136, 144, 146), spheres (e.g. spheres 150, 160) or openings (e.g. openings 154, 254).

In some embodiments, where nonconductive material is injected in to space 152 or space 162, intermediate fill plug 190 may have a central aperture to allow the nonconductive material to pass through. As the nonconductive material solidifies, it may engage with locking feature 192 (depicted in FIG. 19C) or locking feature 194 (depicted in FIG. 19D). Locking feature 192 comprises an aperture that may be filled with nonconductive material that is injected. Once the nonconductive material hardens, it locks intermediate fill plug 190 in place. Similarly, locking feature 194 comprises one or more notches that may be filled with nonconductive material to lock intermediate fill plug 190 in place.

The ability of a body that spans a gap between channels or other indentations to resist forces may be increased by configuring the body and/or the channels or indentations in which the body is received such that contact between the body and surfaces of the channels or other indentations is distributed along a line or on a surface as opposed to being a point contact. In some embodiments bodies are engaged in channels that are shaped to provide such distributed contact. In some embodiments the shaping comprises pockets or recesses formed along sides of grooves (e.g. grooves 134, 136, 144, 146) that are shaped to conform to the surfaces of bodies received in the grooves. For example, where the bodies are spherical (like spheres 150, 160 for example) the recesses may have the form of a portion of a sphere of the same diameter as spheres 150, 160.

Recesses or pockets may be formed on one or both sides of a groove. In some embodiments recesses are formed along opposing sides of grooves 134 and 144 or opposing sides of grooves 136, 146.

Torque requirements on a gap sub are typically not symmetrical. Torques that arise as a result of drilling are generally in one direction. The recesses in channels 136, 146 may be located such that the torques that arise as a result of drilling tend to more fully engage spheres 160 (or other bodies in channels 136, 146) with the provided recesses.

Axial forces that a gap sub may be called upon to resist are also typically not symmetrical. For example, a gap sub close to a drill bit at the downhole end of a drill string may need to withstand very significant compressive forces (e.g. arising from the weight of the drill string above the gap sub). The forces that tend to extend the gap sub will typically be significantly lower than the compressive forces. Consequently, the recesses in channels 134, 144 may be located such that the largest expected axial forces tend to more fully engage spheres 150 (or other bodies in channels 134, 144) with the provided recesses.

Recesses or pockets may be provided along one or both edges of one or more grooves in any of the embodiments described herein. In some embodiments a process for making a gap sub comprises applying forces to male and female parts 130, 140 which tend to seat bodies (e.g. spheres 150 and/or 160) in corresponding recesses or pockets while injecting a settable dielectric material into the gap. In some embodiments the forces comprise a torque. In some embodiments the forces comprise both a torque and an axial force. In some embodiments the forces comprise an axial force.

Recesses or pockets may be formed to receive bodies having shapes other than spherical shapes. For example, pockets may be shaped to receive cylindrical or barrel-shaped bodies.

It is not necessary that pockets or recesses be formed in all channels. In some embodiments some channels comprise pockets or recesses as described above and other channels do not. For example, 1, 2, or more channels comprising pockets or recesses may be provided between each pair of adjacent channels that do not comprise pockets or recesses. In embodiments where not all channels comprise pockets or recesses corresponding channels on male and female parts 130, 140 that do not comprise pockets or recesses may be positioned such that they are properly aligned to receive bodies (e.g. spherical balls 160) when bodies in the other channels that do comprise recesses or pockets are fully engaged in the recesses or pockets. Inserting bodies in the channels that do not comprise recesses or pockets retains the bodies in the other channels that do comprise recesses or pockets such that those bodies are kept fully engaged in the recesses or pockets.

A method for making a gap sub in an embodiment where some of channels 136, 146 include pockets or channels and some do not may comprise: inserting bodies into those channels that do include pockets or recesses; twisting male part 130 relative to female part 140 such that the bodies are each received in corresponding pockets or recesses in the sides of corresponding channels 136, 146 and such that corresponding channels 136, 146 that do not include pockets or recesses are aligned with one another; and inserting bodies into the channels 136, 146 that do not include pockets or recesses.

A method for making a gap sub in an embodiment where some of channels 134, 144 include pockets or channels and some do not may comprise: inserting bodies into those channels 134, 144 that do include pockets or recesses; moving male part 130 axially relative to female part 140 such that the bodies are each received in a corresponding pocket or recess in the sides of corresponding channels 134, 144 and such that corresponding channels 134, 144 that do not include pockets or recesses are aligned with one another; and inserting bodies into the channels 134, 144 that do not include pockets or recesses.

Figure 20A:
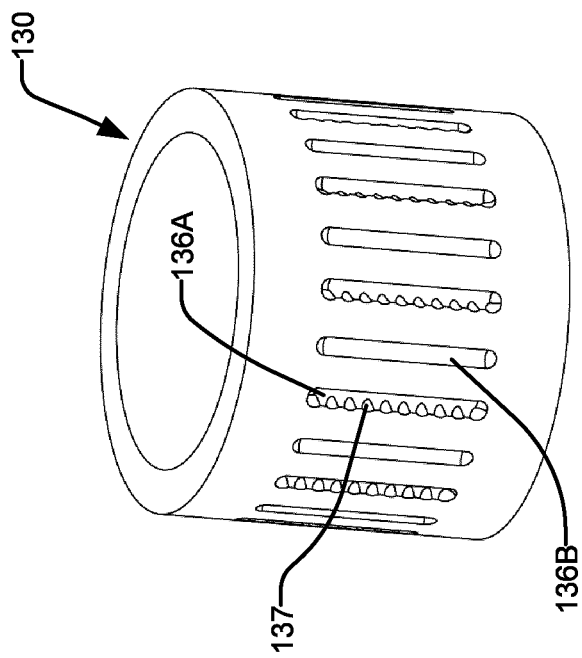
FIG. 20A illustrates a portion of an exemplary male part.
Figure 20B:
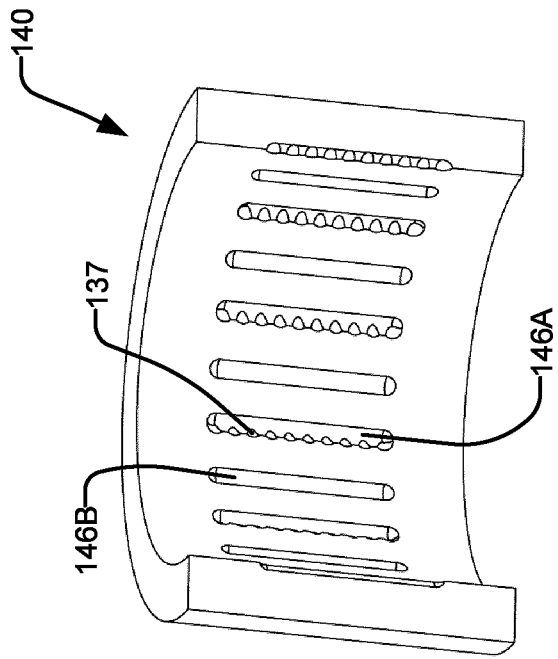
FIG. 20B illustrates a portion of an exemplary female part.

FIG. 20A is a schematic view showing a portion of an exemplary male part 130 comprising channels 136A that do include pockets 137 that are cup-shaped to receive portions of balls 160 alternating with channels 136B that do not include pockets 137. FIG. 20B is a schematic view showing a portion of an exemplary female part 140 comprising channels 146A that do include pockets 137 that are cup-shaped to receive portions of balls 160 alternating with channels 146B that do not include pockets 137.

Figure 20C:
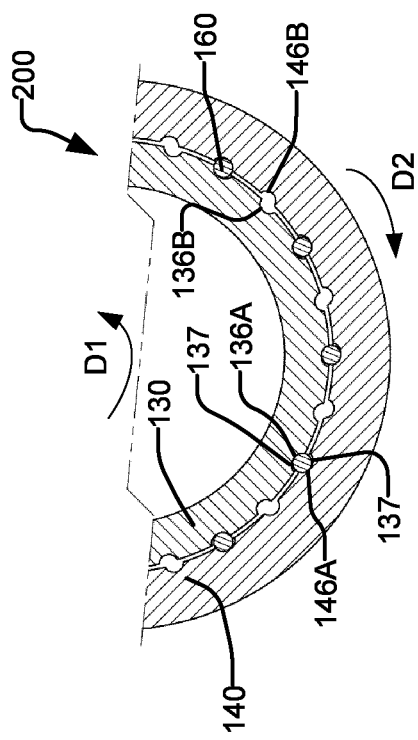
FIG. 20C is a cross-section of a portion of an exemplary gap sub assembly.

FIG. 20C is a cross-section showing a portion of an exemplary gap sub 200 comprising male and female parts 130,140 with channels 136A, 146A having pockets 137 and channels 136B,146B without pockets 137. Male part 130 is positioned relative to female part 140 such that balls 160 can be inserted into channels 136A, 146A. Channels 136B, 146B are misaligned. Rotating male part 130 relative to female part 140 in direction D1 or rotating female part 140 relative to male part 130 in direction D2 fully engages balls 160 with pockets 137 and aligns channels 136B, 146B.

Figure 20D:
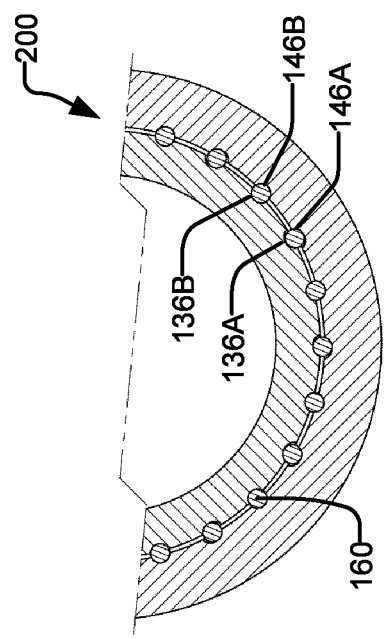
FIG. 20D is a cross-section of a portion of an exemplary gap sub assembly.

FIG. 20D illustrates a cross-section showing a portion of exemplary gap sub 200 comprising channels 136A, 136B, 146A, 146B engaged with balls 160.

Providing spherical balls as the bodies that retain and maintain space between male and female parts 130, 140 is convenient because spherical balls do not have a required orientation and can be pushed along channels that have variable curvature. However, bodies having other shapes are also advantageous.

For straight sections of channels (e.g. channels 136, 146) the bodies may be cylindrical or have other shapes in which the body has a constant cross-sectional shape (e.g. such bodies may have the form of rods that have cross sections that are regular hexagons, other hexagonal shapes, square, rectangular, circular, oval, etc.). The channels which receive such bodies may have sides that conform to the side faces of the bodies. This can provide at least a line of contact between the body and each of the grooves with which it is engaged. Such bodies may provide significantly greater bearing face surface area than a group of spherical balls occupying the same section of a groove.

For sections of channels that have a constant curvature (e.g. channels 134, 144) bodies may be provided in the form of cylindrical segments bent to match the curvature of the channels or in the form of barrel-shaped segments, for example. Such bodies may be pushed along the channels in much the same way as spherical balls.

While such bodies may have the form of elongated rods it is advantageous for the bodies to be provided in relatively short sections. In some embodiments the bodies comprise a plurality of short segments that fit together end-to-end to form elongated rods. In some embodiments the length of each section is no more than 2 to 6 times greater than the size of the gap between the surfaces in which channels 136, 146 are formed. Providing bodies on the form of such short segments can tend to limit the propagation of cracks and can tend to reduce the likelihood that the bodies will be cracked or otherwise damaged by the loads/bending experienced when the gap sub is in use.

Figure 21A:
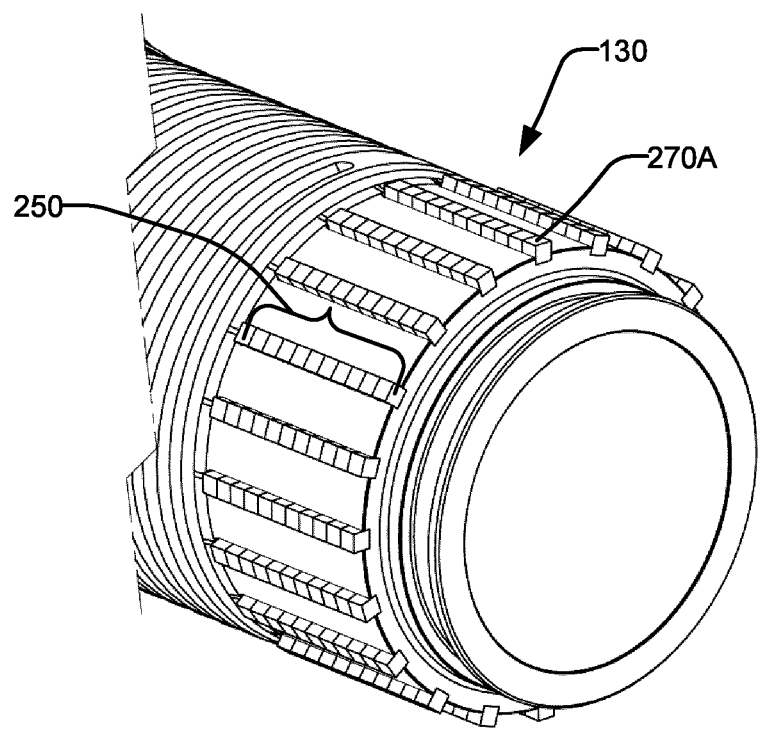
FIG. 21A is a perspective view of exemplary bodies having a square cross-section installed on a portion of an exemplary male part.
Figure 21B:
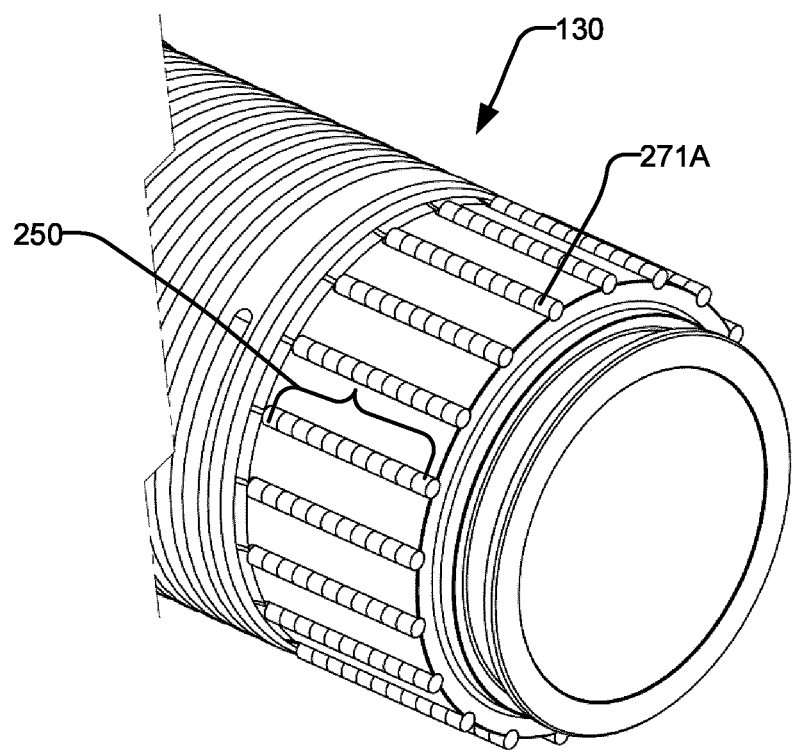
FIG. 21B is a perspective view of exemplary bodies having a round cross-section installed on a portion of an exemplary male part.

FIG. 21A is a perspective view of a male part 130 in an example embodiment wherein bodies 250 have the form of segmented rods having a square cross-section. In the illustrated embodiment individual segments 270A of bodies 250 are in the form of cubes. FIG. 21B is a perspective view of a male part 130 in an example embodiment wherein bodies 250 have the form of segmented rods having a round cross-section. In the illustrated embodiment individual segments 271A of bodies 250 are in the form of small cylinders.

In some embodiments the bodies are in the form of rods that are pre-formed to have spaced-apart weak sections such that the rods can be inserted as single components but will snap at the weak sections into separate segments if exposed to sufficient forces in use.

Figure 22A:
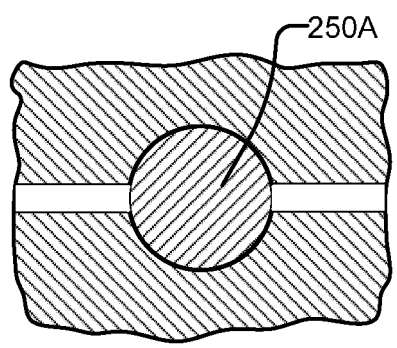
FIGS. 22A through 22F are schematic cross-sectional views through rod-like bodies of various cross-sectional shapes engaged to span a gap between channels having various cross-sectional configurations.
Figure 22B:
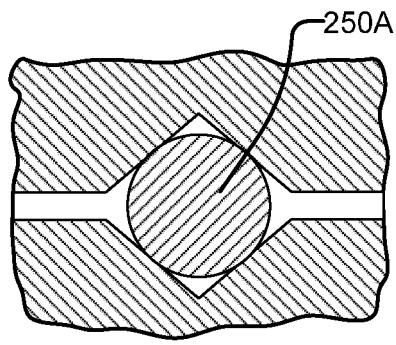
Figure 22C:
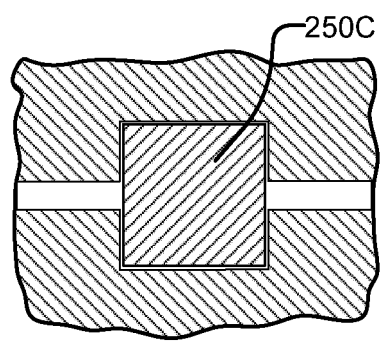
Figure 22D:
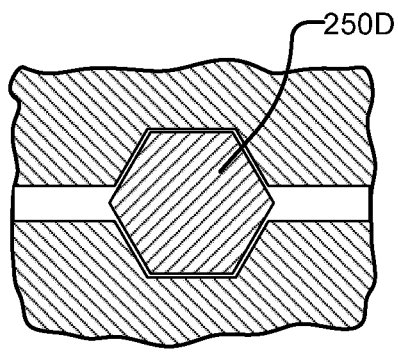
Figure 22E:
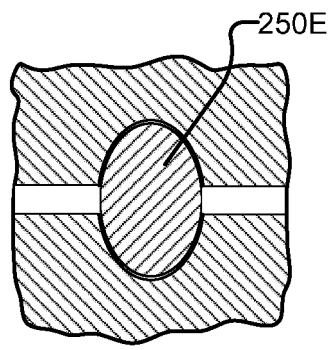
Figure 22F:
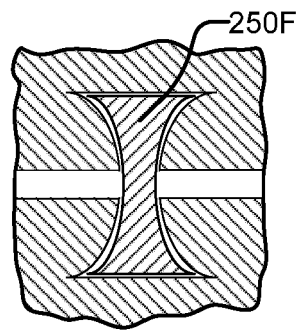
Figure 23:
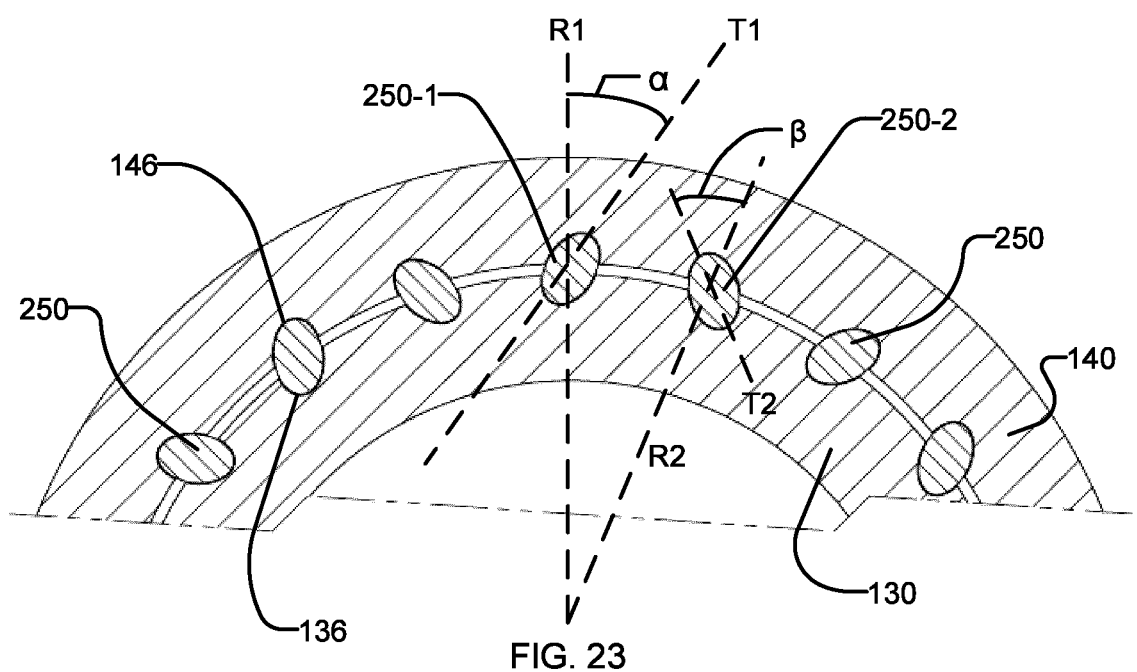
FIG. 23 is a cross-section of a portion of an exemplary gap sub assembly.

FIGS. 22A through 22F are schematic cross sections through a plurality of example bodies and grooves. FIG. 22A shows a cylindrical body 250A engaged between arcuate grooves. FIG. 22B shows a cylindrical body 250A engaged between V-shaped grooves. FIG. 22C shows a square body 250C received between rectangular grooves. FIG. 22D shows a hexagonal body 250D received between trapezoidal grooves. FIG. 22E shows an elliptical body 250E engaged between partial elliptical grooves. It is not mandatory that the cross-sectional shapes of the bodies are convex. For example, FIG. 22F shows a bowtie-shaped body 250F engaged between dovetail grooves. In the embodiment of FIG. 22F body 250F is slid axially into the grooves (either one at a time or simultaneously).

Where the bodies used have non-circular cross-sections, the bodies may be oriented to improve the abilities of the bodies to resist forces applied between the male and female parts. In example embodiments a longer dimension of the cross section is aligned at an angle to the radial line passing from a longitudinal centerline of the male part through a center of the body. An example embodiment having this construction is illustrated in FIG. 23 which is a cross section through a gap sub. Bodies 250 have elliptical cross-sections. Each of bodies 250 spans between a groove 136 on male part 130 and a corresponding groove 146 on female part 140.

Grooves 136 and 146 have cross-sectional shapes that substantially conform to the received portion of body 250. Grooves 136, 146 are formed in such a way that at least some of bodies 250 are held such that the major transverse axis of the body does not coincide with a radius of the gap sub.

In the illustrated embodiment the elliptical cross section of at least some of bodies 250 (identified as 250-1) is aligned such that the major transverse axis T1 of the body is aligned at an angle α to a radial line R1 passing through the center of the body 250. The elliptical cross section of some other ones of bodies 250 (identified as 250-2) is aligned such that the major transverse axis T2 of the body is aligned at an angle β to a radial line R2 passing through the center of the body 250. In some embodiments bodies 250-1 alternate with bodies 250-2.

Angles α and β may be the same or different in magnitude. Advantageously angles α and β are opposite in sign such that bodies 250-1 are best positioned to resist torque that tends to turn female part 140 in a first direction relative to male part 130 and bodies 250-2 are best positioned to resist torque that tends to turn female part 140 in a second direction opposite to the first direction relative to male part 130.

Bodies 250 may comprise rods or rows of segments having cross-sections as shown in FIG. 22. Bodies 250 may have other cross-sectional shapes (e.g. rectangular, obround, oval, etc.) which permit a longer transverse dimension of the bodies to be oriented to best resist forces applied between male and female parts 130, 140.

Bodies in the form of rods or non-spherical segments may be inserted directly into a gap sub or may be provided in the form of pods, scarves or rings in substantially the same manner as described above (see description of ring 164, scarf 166 and pods 168 above). This can improve efficiency for making a gap sub by reducing the number of parts that must be handled individually.

In some embodiments the surfaces on either side of one or more grooves or other recesses in which bodies are received are formed such that opposing edges of the grooves have different elevations. This construction can be advantageous in cases where the bodies are expected to resist forces that are larger in one direction than another as it can provide greater area of contact between a body and the male and female parts 130, 140 while maintaining a desired gap between male and female parts 130, 140. Any of the embodiments described herein may be modified to provide this feature. Elevation of surfaces on the male part may be measured radially outwardly from a longitudinal centerline of the male part. Elevation of surfaces on the female part may be measured radially inwardly from a longitudinal centerline of the female part.

Figure 24:
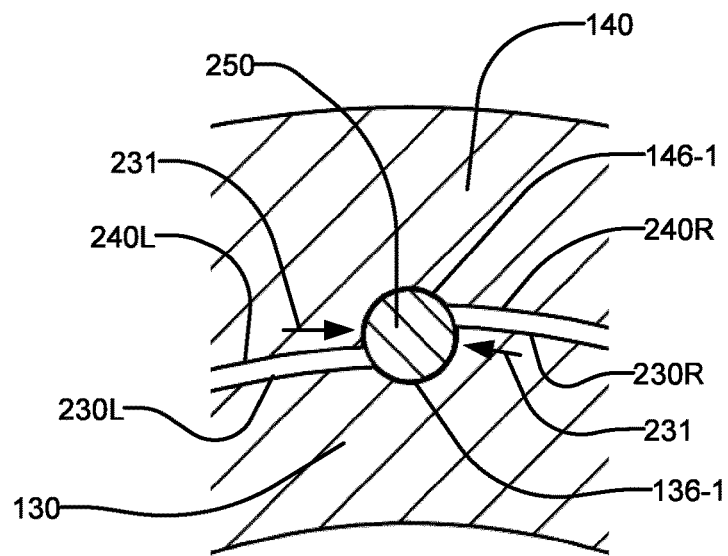
FIG. 24 is an expanded cross-section of a portion of an exemplary gap sub assembly.

FIG. 24 is a cross section through a body 250 in an example embodiment wherein the body (which in the illustrated embodiment may be in the form of a sphere or rod) spans a gap between a groove 136-1 in male part 130 and a groove 146-1 in female part 140. In this embodiment groove 146-1 extends between surfaces 240L and 240R on female part 140 and groove 136-1 extends between surfaces 230L and 230R on male part 130. Surface 240L projects more from female part 140 than surface 240R. Surface 230R projects more from male part 130 than surface 230L. This construction allows body 250 to better resist forces in the direction of arrow 231.

In some embodiments a centroid of the cross-section of at least one of the bodies that spans between the grooves of a pair of corresponding grooves (e.g. 136-1 and 146-1) is radially between the higher side of the groove on the male mating section and the higher side of the groove on the female mating section.

There are several ways in which the elevations of surfaces adjacent to different grooves may be arranged. In different embodiments one may encounter a different pattern of lower and higher edges as one travels in a direction transverse to a set of grooves (e.g. grooves 134, 144, 136 or 146). The path travelled along may, for example, extend on a circumferential line following the surface of the male or female part or a longitudinal line extending along the surface of the male or female part.

For example in one embodiment one may encounter a first side of a first groove that is higher in elevation, cross the first groove, encounter a second side of the first groove that is lower in elevation, travel until a first side of a second groove that is higher in elevation, cross the second groove to a second side of the second groove that is lower in elevation, and so-on. In other words, the pattern of higher and lower sides of the grooves in this example may be represented as H-L, H-L, H-L . . . and so on where the hyphens represent grooves and the commas represent surfaces between grooves. The same pattern could be represented as L-H, L-H, L-H . . . when travelling along the path in the opposite direction. Patterns of higher and lower sides of corresponding grooves on the male and female parts may be complementary to one another (e.g. the higher side of a groove on the male part is generally aligned with the lower side of the corresponding groove on the female part and vice versa. Such embodiments may be beneficial where forces exerted parallel to the path are expected to be much larger in one direction than in the opposing direction.

Figure 25:
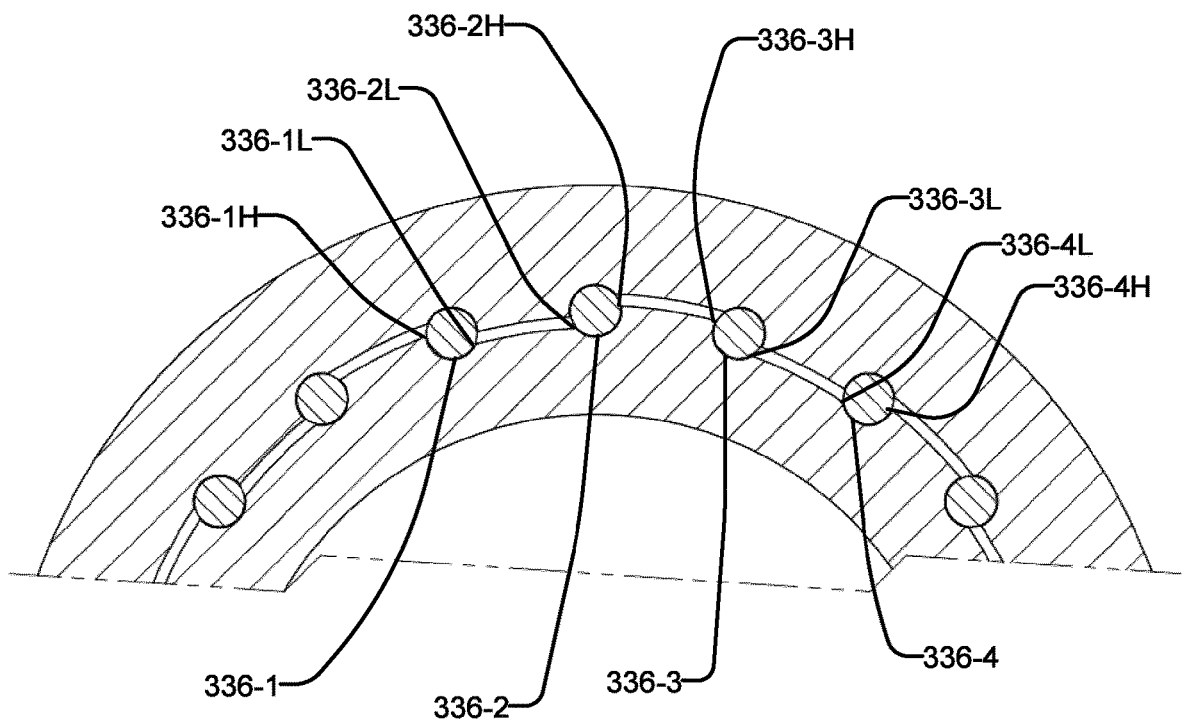
FIG. 25 is a cross-section of an exemplary gap sub assembly groove pattern.

In another example embodiment the pattern may be represented as H-L, L-H, H-L, L-H . . . and so on. FIG. 25 is a cross section through an example gap sub having this construction. In the illustrated embodiment, one may encounter a first side 336-1H of groove 336-1 that is higher in elevation than a second side 336-1L, followed by second side 336-1L, followed by a first side 336-2L of groove 336-2 that is lower in elevation than a second side 336-2H, followed by second side 336-2H, followed by a first side 336-3H of groove 336-3 that is higher in elevation than a second side 336-3L, followed by second side 336-3L, followed by a first side 336-4L of groove 336-4 that is lower in elevation than a second side 336-4H, followed by second side 336-4H . . . and so on. Such embodiments may beneficially increase capacity for resisting forces between the male and female parts compared to similar embodiments where the sides of grooves are equal in elevation. Other embodiments are also possible. In any embodiments where the elevations on opposing sides of a groove differ, surfaces between adjacent grooves may ramp, curve or step to accommodate any difference in elevation between the side of one groove and the nearest side of an adjacent groove.

Some embodiments in which the elevations on opposing sides of a groove differ also provide recesses or pockets to receive bodies as described above. In such embodiments the recesses or pockets may advantageously be provided on the wall of the groove that is on the higher side of the groove.

In some embodiments the high side of a groove on the female part radially overlaps with the high side of the corresponding groove on the male part. In such embodiments, forces that attempt to move the male part relative to the female part in a direction that would bring the high sides of these grooves closer together can be resisted by a body spanning between these grooves in a way that results on compression of the body as opposed to shear of the body.

Figure 26:
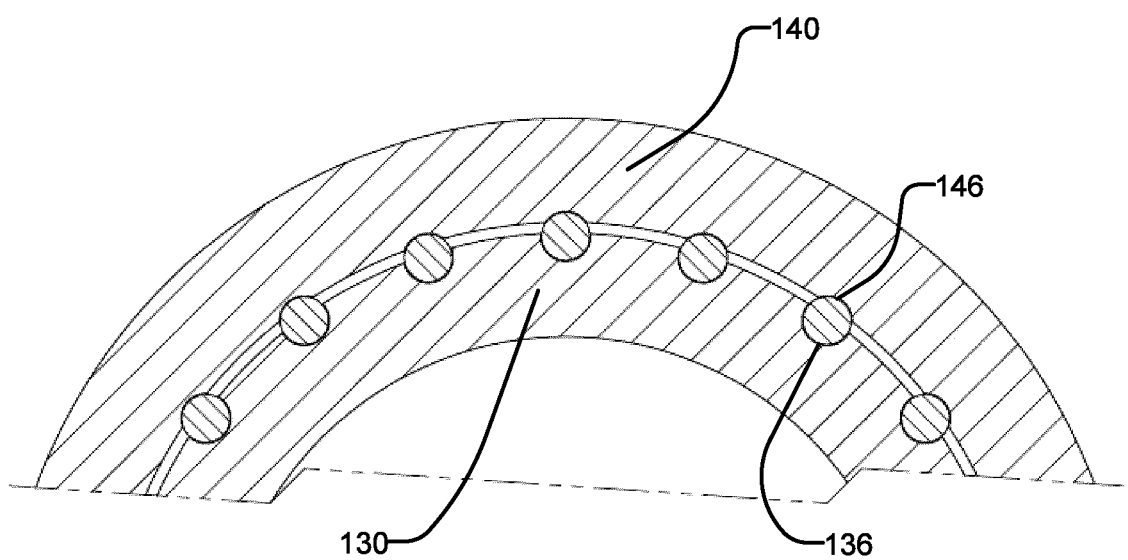
FIG. 26 is a cross-section of a portion of an exemplary gab sub assembly.

It is not mandatory for corresponding grooves parts (e.g. grooves 134, 144 or grooves 136, 146) on the male and female parts 130,140 to receive a body to the same depth. In some embodiments a groove in male part 130 is deeper than the corresponding groove in female part 140 such that a body (e.g. a spherical ball) projects into the groove of male part 130 more deeply below the surrounding surface of male part 130 than the body projects into the groove of female part 140. FIG. 26 shows an example embodiment wherein grooves 136 on male part 130 are deeper than corresponding grooves 146 on female part 140. This construction may provide enhanced torque resistance.

In other embodiments the bodies and corresponding grooves or other recesses are shaped such that a surface area of contact between the body and the male part is greater than the surface area of contact between the body and the female part.

Interpretation of Terms

Unless the context clearly requires otherwise, throughout the description and the claims:

"comprise," "comprising," and the like are to be construed in an inclusive sense, as opposed to an exclusive or exhaustive sense; that is to say, in the sense of "including, but not limited to".

"connected," "coupled," or any variant thereof, means any connection or coupling, either direct or indirect, between two or more elements; the coupling or connection between the elements can be physical, logical, or a combination thereof.

"herein," "above," "below," and words of similar import, when used to describe this specification shall refer to this specification as a whole and not to any particular portions of this specification.

"or," in reference to a list of two or more items, covers all of the following interpretations of the word: any of the items in the list, all of the items in the list, and any combination of the items in the list.

the singular forms "a," "an," and "the" also include the meaning of any appropriate plural forms.

Words that indicate directions such as "vertical," "transverse," "horizontal," "upward," "downward," "forward," "backward," "inward," "outward," "left," "right," "front," "back," "top," "bottom," "below," "above," "under," and the like, used in this description and any accompanying claims (where present) depend on the specific orientation of the apparatus described and illustrated. The subject matter described herein may assume various alternative orientations. Accordingly, these directional terms are not strictly defined and should not be interpreted narrowly.

Where a component (e.g. a body, assembly, device, drill string component, drill rig system, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

It is therefore intended that the following appended claims and claims hereafter introduced are interpreted to include all such modifications, permutations, additions, omissions and sub-combinations as may reasonably be inferred. The scope of the claims should not be limited by the preferred embodiments set forth in the examples, but should be given the broadest interpretation consistent with the description as a whole.

What is claimed is:

1. A gap sub assembly comprising:
a female part having a female mating section and a male part electrically isolated from the female part, the male part having a male mating section and a gap section, the male mating section being inserted into a bore of the female mating section whereby the male and female mating sections overlap in an axial direction and are spaced radially apart from one another to provide a radial gap between the male and female mating sections wherein the male mating section comprises a first generally cylindrical male mating subsection having a first external diameter and one or more longitudinal grooves formed into an exterior surface thereof and a second generally cylindrical male mating subsection having a second external diameter greater than the first external diameter and one or more circumferentially-extending grooves formed into an exterior surface thereof with a step between the first and second male mating subsections, the step transitioning from the first external diameter to the second external diameter and extending circumferentially around the male mating section between the first and second male mating subsections, and the female mating section comprises a first female mating subsection having a first internal diameter greater than the first external diameter and one or more longitudinal grooves formed into an interior surface thereof a second female mating subsection having a second internal diameter greater than the second external diameter and the first internal diameter and one or more circumferentially-extending grooves formed into an interior surface thereof;
an electrically insulating collar positioned on the gap section;
a first plurality of electrically-insulating bodies located between the overlapping male and female mating sections and spanning between corresponding ones of the longitudinal grooves in the first male and female mating subsections;
a second plurality of electrically-insulating bodies located between the overlapping male and female mating sections and spanning between corresponding ones of the circumferentially-extending grooves in the second male and female mating subsections;
such that the male and female parts are mechanically coupled together.

2. A gap sub assembly according to claim 1, wherein the one or more longitudinal grooves of the male mating section are radially aligned with corresponding ones of the one or more longitudinal grooves of the female mating section.

3. A gap sub assembly according to claim 2, wherein the first plurality of electrically-insulating bodies comprises a plurality of first spheres.

4. A gap sub assembly according to claim 1 comprising a member located in the radial gap that attaches together two or more of the first plurality of electrically-insulating bodies.

5. A gap sub assembly according to claim 4, wherein the member comprises a ring extending around the first male mating subsection and the two or more of the first plurality of electrically-insulating bodies are embedded in the ring.

6. A gap sub assembly according to claim 4, wherein the member comprises a scarf comprising a sheet of flexible material wrapped around the first male mating subsection and the two or more of the first plurality of electrically-insulating bodies are attached to the scarf.

7. A gap sub assembly according to claim 4, wherein the member attaches together two or more of the electrically insulating bodies that span between the same-corresponding longitudinal grooves of the first male and female mating subsections.

8. A gap sub assembly according to claim 1, wherein the one or more circumferentially-extending grooves of the male mating section are radially aligned with corresponding ones of the one or more circumferentially-extending grooves of the female mating section.

9. A gap sub assembly according to claim 8 wherein the circumferentially-extending grooves of the male and female mating sections extend helically around surfaces of the male and female mating sections respectively.

10. A gap sub assembly according to claim 1 wherein the second plurality of electrically-insulating bodies comprises a plurality of second spheres.

11. A gap sub assembly according to claim 1 comprising a dielectric material filling the radial gap around the first and second pluralities of electrically-insulating bodies.

12. A gap sub assembly according to claim 1, wherein the first plurality of electrically-insulating bodies comprise ceramic bodies.

13. A gap sub assembly according to claim 1, wherein the second plurality of electrically-insulating bodies comprise ceramic bodies.

14. A gap sub assembly according to claim 1, comprising a first shoulder on the male part and a second shoulder on the female part respectively at first and second ends of the gap section and wherein the insulating collar is pre-loaded in compression to bear against the first and second shoulders with a pre-load force.

15. A gap sub assembly according to claim 1, comprising a threaded ring mounted adjacent to the gap section, the threaded ring operable to adjust a compression of the insulating collar.

16. A gap sub assembly according to claim 1 comprising one or more fill openings, each of the fill openings extending from a surface of the gap sub to a corresponding one of the circumferentially-extending grooves, the fill openings each dimensioned to allow passage of a body of the second plurality of bodies into the radial gap.

17. A gap sub assembly according to claim 16 wherein one or more of the fill openings is closed by a fill plug comprising an elastomer seal.

18. A gap sub assembly according to claim 17 wherein the elastomer seal comprises an O-ring.

19. A gap sub assembly according to claim 17 comprising an intermediate plug installed in the fill opening between the fill plug and the corresponding one of the circumferentially-extending grooves.

* * * * *